(12) United States Patent
Mikuriya et al.

(10) Patent No.: US 7,877,203 B2
(45) Date of Patent: Jan. 25, 2011

(54) MAP INFORMATION PROCESSING APPARATUS AND STORAGE MEDIUM OF MAP INFORMATION

(75) Inventors: Makoto Mikuriya, Tokyo (JP); Masaharu Umezu, Tokyo (JP); Tomoya Ikeuchi, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 908 days.

(21) Appl. No.: 11/791,939

(22) PCT Filed: Nov. 14, 2005

(86) PCT No.: PCT/JP2005/020874

§ 371 (c)(1),
(2), (4) Date: May 31, 2007

(87) PCT Pub. No.: WO2006/085412

PCT Pub. Date: Aug. 17, 2006

(65) Prior Publication Data

US 2008/0091344 A1 Apr. 17, 2008

(30) Foreign Application Priority Data

Feb. 8, 2005 (JP) .............................. 2005-032023

(51) Int. Cl.
*G01C 21/30* (2006.01)
*G01C 21/32* (2006.01)

(52) U.S. Cl. ...................... 701/208; 701/202; 701/211; 701/213; 340/995.1; 340/988; 340/995.19; 73/178 R

(58) Field of Classification Search ................ 701/208, 701/202, 213, 25, 211, 217; 73/178 R; 340/995.1, 340/995.19, 988–990
See application file for complete search history.

(56) References Cited

U.S. PATENT DOCUMENTS 6,401,027 B1 * 6/2002 Xu et al. ..................... 701/117

(Continued)

FOREIGN PATENT DOCUMENTS

CA 2266208 * 3/1999

(Continued)

OTHER PUBLICATIONS

Proceedings of the Vehicle Navigation and Information System Conference, Sep. 11-13, 1989 entitled "Digital Road Map Data Base for Vehicle Navigation and Road Information Systems" by S. Kamijo et al. pp. 319-323.*

(Continued)

*Primary Examiner*—Cuong H Nguyen
(74) *Attorney, Agent, or Firm*—Birch, Stewart, Kolasch & Birch, LLP

(57) ABSTRACT

In a map information processing apparatus including a processor 5 for updating map information containing map data stored in a map information storage device 3, road network data contained in the map data stored in the map information storage device has a data structure in which the road network data is composed of link strings each of which represents a series of roads in a road network as a series of links connecting nodes, the road network being represented by the nodes and the links; each of the link strings is represented by a link string record in which link records defining the links are arranged in order of the series of the links; each link constituting the link strings is provided with an invariable link identifier proper to each link; and node indication information for designating each node included in the link strings is represented by the link identifier of the link having the node as its one end.

15 Claims, 15 Drawing Sheets

U.S. PATENT DOCUMENTS

| | | | |
|---|---|---|---|
| 6,421,659 B1 * | 7/2002 | Nomura | 1/1 |
| 6,470,266 B1 * | 10/2002 | Ito et al. | 701/209 |
| 7,379,812 B2 * | 5/2008 | Yoshioka et al. | 701/208 |
| 2007/0156326 A1 * | 7/2007 | Nesbitt | 701/200 |
| 2008/0091344 A1 * | 4/2008 | Mikuriya et al. | 701/208 |
| 2008/0130661 A1 * | 6/2008 | Jiang et al. | 370/401 |
| 2008/0162039 A1 * | 7/2008 | Takahata | 701/208 |
| 2009/0043486 A1 * | 2/2009 | Yang et al. | 701/117 |
| 2009/0252134 A1 * | 10/2009 | Schlicht et al. | 370/338 |
| 2010/0142421 A1 * | 6/2010 | Schlicht et al. | 370/310 |
| 2010/0142445 A1 * | 6/2010 | Schlicht et al. | 370/328 |
| 2010/0142446 A1 * | 6/2010 | Schlicht et al. | 370/328 |
| 2010/0142447 A1 * | 6/2010 | Schlicht et al. | 370/328 |
| 2010/0142448 A1 * | 6/2010 | Schlicht et al. | 370/328 |
| 2010/0150120 A1 * | 6/2010 | Schlicht et al. | 370/338 |

FOREIGN PATENT DOCUMENTS

| | | |
|---|---|---|
| EP | 0 848 232 A2 | 6/1998 |
| EP | 0 848 232 A3 | 6/1998 |
| EP | 1 304 549 A1 | 4/2003 |
| JP | 8-332562 * | 12/1996 |
| JP | 10-171347 A | 6/1998 |
| JP | 11-070443 * | 3/1999 |
| JP | 11-325940 | 11/1999 |
| JP | 2001-56823 | 2/2001 |
| JP | 2004-28846 A | 1/2004 |
| JP | 2004-157172 | 6/2004 |
| JP | 2004-198321 A | 7/2004 |
| JP | 2005-032023 * | 2/2005 |
| WO | PCT/JP05/20874 * | 5/2007 |

OTHER PUBLICATIONS

Scalable, Real-Time Map-Matching Using IBM's System S; Bouillet, Eric; Ranganathan, Anand; Mobile Data Management (MDM), 2010 Eleventh International Conference on; Digital Object Identifier: 10.1109/MDM.2010.36; Publication Year: 2010, pp. 249-257.*

Design and Implementation of AIS Link Layer Using SDL-RT; Hassine, M.B.; Grati, K.; Ghazel, A.; Kouki, A.; Systems Conference, 2008 2nd Annual IEEE; Digital Object Identifier: 10.1109/SYSTEMS.2008.4518998; Publication Year: 2008, pp. 1-5.*

Distributed Databases in Dynamic R-Tree for Vehicle Information Systems; Murase, Y.; Aikebaier, A.; Enokido, T.; Takizawa, M.; Advanced Information Networking and Applications—Workshops, 2008. AINAW 2008. 22nd International Conference on Digital Object Identifier: 10.1109/WAINA.2008.237; Publication Year: 2008, pp. 133-138.*

Robustification of a map aided location process using road direction; Selloum, Ahmed; Betaille, David; Le Carpentier, Eric; Peyret, Francois; Intelligent Transportation Systems (ITSC), 2010 13th International IEEE Conference on; Digital Object Identifier: 10.1109/ITSC.2010.5625206; Publication Year: 2010, pp. 1504-1510.*

Generating Navigation Capable Maps from User Provided Data with Woodtracker; Weigel, M.; Preuss, T.; Brustel, J.; Complex, Intelligent and Software Intensive Systems (CISIS), 2010 International Conference on; Digital Object Identifier: 10.1109/CISIS.2010.163; Publication Year: 2010, pp. 544-548.*

Using recursive Bayesian estimation for matching GPS measurements to imperfect road network data; Mazhelis, Oleksiy; Intelligent Transportation Systems (ITSC), 2010 13th International IEEE Conference on; Digital Object Identifier: 10.1109/ITSC.2010.5625138; Publication Year: 2010, pp. 1492-1497.*

Probe Car System based Traffic Information Service Experiment; Wenjia Wang; Wei Lu; Hiroaki Mizuta; Gang Wang; Yong Du; Wentao Liu; Xiaochun Tang; ITS Telecommunications Proceedings, 2006 6th International Conference on Digital Object Identifier: 10.1109/ITST.2006.288806; Publication Year: 2006, pp. 1134-1136.*

"KIWI Format Ver.1.10", KIWI Investigation Committee, 7.2 Road Data Frame, May 1998.

Wie Graphen Verbindungen, magazine article published in : DOS 8'95, 1995, pp. 192-194.

* cited by examiner

Update Record

| Update Record Size |
| Update Target Data Type |
| Update Operation Type |
| Update Target Designation |
| Update Operand |

Route Guidance Data

| Route Guidance Record #1 |

FIG. 17

Road Network Update Data

|  | Update Target Data Type | Update Operation Type | Update Target Designation | Update Operand |
|---|---|---|---|---|
| Update Record #r1 | Link String Header | Overwrite | Link String Number = 0 | Link String Header 0' |
| Update Record #r2 | Link List | Delete | Link String Number = 0 Link Number = 1 | (reserved) |
| Update Record #r3 | Link List | Insert | Link String Number = 0 Link Number = 2 | Link Record #01a Link Record #01b |
| Update Record #r4 | Link String List | Insert | Link String Number = 1 | Link String Record #6 |
| Update Record #r5 | Link List | Overwrite | Link String Number = 1 Link Number = 1 | Matching Node Indication Information (S1') |
| Update Record #r6 | Link String List | Delete | Link String Number = 2 | (reserved) |
| Update Record #r7 | Link String List | Overwrite | Link String Number = 4 | Link String Header 4' |
| Update Record #r8 | Link List | Delete | Link String Number = 4, Link Number = 0 | (reserved) |
| Update Record #r9 | Link List | Overwrite | Link String Number = 4, Link Number = 3 | Matching Node Indication Information (S11) |

FIG. 18

Route Guidance Update Data

|  | Update Target Data Type | Update Operation Type | Update Target Designation | Update Operand |
|---|---|---|---|---|
| Update Record #g0 | Route Guidance Data | Delete | Route Guidance Record Number = 0 | Unassigned |

FIG. 20

| Operation Control Data Section | ~10 |
| Traveling Locus Data Section | ~11 |
| Present Position Data Section | ~12 |
| Route Data Section | ~13 |
| Required Route Calculation Data Management Section | ~14 |
| Route Calculation Data Section | ~15 |
| Route Calculation Update Data Section | ~16 |
| Required Map Data Management Section | ~17 |
| Map Data Section | ~18 |
| Map Update Data Section | ~19 |

Matching Node Indication
Information

| Link Indication Information |

Corresponding Node Indication
Information

| Link Indication Information |

MAP INFORMATION PROCESSING APPARATUS AND STORAGE MEDIUM OF MAP INFORMATION

TECHNICAL FIELD

The present invention relates to a map information processing apparatus for processing map information and a storage medium of the map information, and particularly to a data structure for facilitating update of map data included in the map information.

BACKGROUND ART

Conventionally, in map data employed in car navigation systems, mobile phones, mobile information terminals and the like, road networks have been represented by nodes indicating points on roads and links indicating roads between the points as shown in Non-Patent Document 1. In other words, the road networks have been represented by a plurality of link strings that represent series of roads as series of links. The link strings include information about the nodes and links. In addition, each of the link strings has identical node information indicating the identity of the nodes, and the identical node information represents connection relationships between links of the road network.

In the conventional map data, to indicate traffic restrictions between the links at a node, an entrance link and exit link to and from the node is specified using traveling sequence of the nodes indicated by the identical node information. Besides, in the conventional map data, to associate route guidance data for guiding a route at an intersection with the nodes, information representing the storage positions of the route guidance data is provided in the nodes in the link string.

As related technology, Patent Document 1 discloses a difference update data creating apparatus for navigation, which accesses difference data associated with road data update efficiently, and enables normal navigation processing even when the difference data is reflected on the original road data. The difference update data creating apparatus has a first creating section and a second creating section: the first creating section not only indicates existing roads and their connection points, but also creates first road data indicating new roads and their connection points, which are updated according to a plurality of road data for navigation conforming to a prescribed format, and creates the difference update data including identical road data identical to second road data indicating the existing roads and their connection points connected to the new roads or to their connection points; and the second creating section creates merging data defining correspondence between the difference update data and a plurality of road data for each road or connection point together with deletion flags for deleting the second road data from the plurality of road data in the navigation processing.

Non-Patent Document 1: "KIWI Format Ver. 1.10", KIWI Investigation Committee, 7.2. Road Data Frame.

Patent Document 1: Japanese patent application laid-open No. 2004-198321.

As described above, in the conventional map data, the identical node information provided for each node in the link string indicates the node in another link string, which is identical to the node of a particular link string. Sequentially following from a node of a particular link string to nodes of other link strings and returning to the first node according to the identical node information, all the nodes appearing in the course of this are decided as identical nodes. This makes it possible to recognize that the links in the link strings joined to each node are connected to each other. As the identical node information, are employed a link string number for designating a link string and a node number within the link string for designating the node. The link string number is the order in the link string sequence, and the node number in the link string is the order in the node sequence in the link string.

In the conventional map data arranged as described above, when updating the map data in accordance with elimination and addition of a link string or node, it is necessary to change the order of the link string sequence and the order of the node sequence in the link string, and to change the link string number and the node number in the link string along with the foregoing changes. In this case, the link strings arranged after the eliminated or added link string must be changed even if they are independent of the eliminated or added link string. Likewise, the identical node information about the nodes arranged after the eliminated or added node must be changed even if it has nothing to do with the eliminated or added node. This offers a problem of increasing the amount of data to be updated, and of requiring complicated update processing for updating the link strings or nodes.

In addition, the entrance link to the node and the exit link from the node are represented in order the node appears when the nodes are followed according to the identical node information. Since the order is changed by the elimination or addition of the link string appearing when following the nodes according to the identical node information, even when a link string having nothing to do with itself is eliminated or added, the information about traffic restrictions from an existing entrance link to an exit link must also be changed. This also presents a problem of increasing the amount of data to be updated, and of complicating the update processing.

Besides, the map data includes route guidance data providing guidance information at intersections as node related information, and each node in the link string is provided with address information indicating the storage position of the route guidance data. Thus, the elimination or addition of the node or link changes the storage positions of the existing route guidance data. Accordingly, the address information indicating the storage positions of the route guidance data in the existing link strings must be changed. This presents a problem of increasing the amount of data to be updated, and of complicating the update processing.

The present invention is implemented to solve the foregoing problems. Therefore it is an object of the present invention to provide a map information processing apparatus and storage medium of the map information capable of reducing the amount of data instructing the update when a road or intersection is added or eliminated, and capable of carrying out the update processing simply and quickly.

DISCLOSURE OF THE INVENTION

The map information processing apparatus in accordance with the present invention includes: a map information storage device for storing map information containing map data; and a processor for updating the map information stored in the map information storage device, wherein road network data contained in the map data stored in the map information storage device has a data structure in which: the road network data is composed of link strings each of which represents a series of roads in a road network as a series of links connecting nodes, the road network being represented by the nodes indicating points on the roads and by the links indicating the roads between the points; each of the link strings is represented by a link string record in which link records defining the links are arranged in order of the series of the links; each link constituting the link strings is provided with an invariable link identifier proper to each link; and node indication information for designating each node included in the link strings is represented by the link identifier of the link having the node as its one end.

The map information processing apparatus in accordance with the present invention includes: a map information storage device for storing map information containing map data; and a processor for updating the map information stored in the map information storage device, wherein road network data contained in the map data stored in the map information storage device has a data structure in which: the road network data is composed of link strings each of which represents a series of roads in a road network as a series of links connecting nodes, the road network being represented by the nodes indicating points on the roads and by the links indicating the roads between the points; each of the link strings is represented by a link string record in which link records defining the links are arranged in order of the series of the links; each of identical nodes contained in the link strings is provided with an invariable identical node identifier that is proper to the identical nodes; and the identical node identifier is used to indicate a link for entering the node or a link for exiting from the node.

The computer readable storage medium of the map information in accordance with the present invention stores map data containing road network data having a data structure in which: the road network data is composed of link strings each of which represents a series of roads in a road network as a series of links connecting nodes, the road network being represented by the nodes indicating points on the roads and by the links indicating the roads between the points; each of the link strings is represented by a link string record in which link records defining the links are arranged in order of the series of the links; each link constituting the link strings is provided with an invariable link identifier proper to each link; and node indication information for designating each node included in the link strings is represented by the link identifier of the link having the node as its one end.

According to the present invention, in the road network data contained in the map data, the node indication information is represented by the invariable link identifier proper to each link constituting the link strings. Accordingly, the node indication information is invariable regardless of the elimination or addition of another link string or link. This obviates the need for updating the node indication information, which results from the elimination or addition of other link string or link. This enables the reduction of the amount of data for instructing the update, and enables the update processing to be carried out simply and quickly.

According to the present invention, to indicate the link for entering the node or the link for exiting from the node, the invariable identical node identifier is used which is proper to the link and independent of the order of the arrangement of the link string records. This obviates the need for updating the identical node identifier, which results from the elimination or addition of unrelated link string. Accordingly, it can reduce the amount of data for instructing the update, and carry out the update processing simply and quickly.

According to the present invention, applying the storage medium to the map information processing apparatus makes it possible, as the foregoing map information processing apparatus according to the present invention, to reduce the amount of data for instructing the update, and to implement the map information processing capable of carrying out the update processing simply and quickly.

BRIEF DESCRIPTION OF THE DRAWINGS

FIG. 17 is a table showing an example of the road network update data used for updating the road network data as shown in FIG. 8 to the road network data as shown in FIG. 15;

FIG. 18 is a table showing an example of the route guidance update data used for updating the route guidance data as shown in FIG. 10 to the route guidance data as shown in FIG. 16;

FIG. 20 is a table showing allocation of the memory of the processor as shown in FIG. 1;

BEST MODE FOR CARRYING OUT THE INVENTION

The best mode for carrying out the invention will now be described with reference to the accompanying drawings to explain the present invention in more detail.

Embodiment 1

Figure 1:
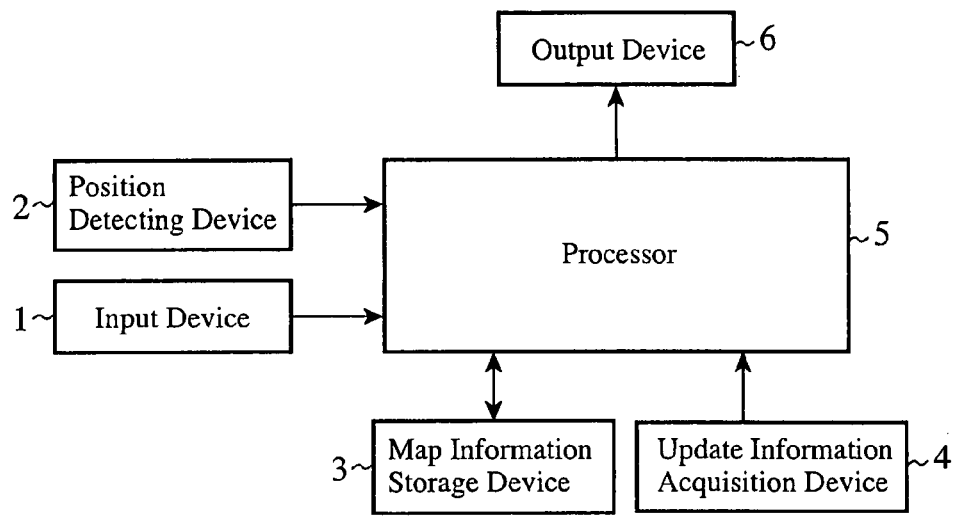
FIG. 1 is a block diagram showing a configuration of a map information processing apparatus of an embodiment 1 in accordance with the present invention.

FIG. 1 is a block diagram showing a configuration of the map information processing apparatus of an embodiment 1 in accordance with the present invention. The map information processing apparatus includes an input device 1, a position detecting device 2, a map information storage device 3, an update information acquisition device 4, a processor 5 and an output device 6.

The input device 1 outputs an instruction signal in accordance with an operation or instruction of a user. More specifically, the input device 1 can include at least one of a voice recognition device for recognizing speech of the user and outputting an instruction signal in response to a recognition result, buttons for outputting an instruction signal in response to a manual operation of the user, and another appropriate input device. The instruction signal output from the input device 1 is delivered to the processor 5.

The position detecting device 2 detects the present position of the vehicle on which the map information processing apparatus is mounted using a GPS (Global Positioning System) receiver, a vehicle speed sensor and an angular velocity sensor. The present position detected by the position detecting device 2 is delivered to the processor 5 as the position information.

The map information storage device 3 includes a hard disk drive using a hard disk as a storage medium of the map information, and operates as a map data acquisition section for acquiring the map data. The map information storage device 3 stores the map information in advance and the processor 5 reads out the stored map information. In addition, the map information storage device 3 stores the map update information obtained from the update information acquisition device 4 by the processor 5.

The update information acquisition device 4 includes a DVD (Digital Versatile Disk) drive, for example, and reads the map update information stored in the update DVD-ROM (Read Only Memory) The update information acquisition device 4 operates as a map update data acquisition section for acquiring the map update data. The map update information read out of the update DVD-ROM by the update information acquisition device 4 is delivered to the processor 5.

The processor 5, which operates as the map data update section, executes various map information processings using the position information supplied from the position detecting device 2 and the map information read from the map information storage device 3. The map information processings include map matching for estimating the present position of the vehicle from the position information and the map data included in the map information; route calculation (route search) for calculating a route from a starting point to a destination; route display for displaying appropriate route candidates obtained as a result of the route calculation together with the road map on the screen of the output device 6; route guidance for providing guidance from the starting point to the destination in accordance with the appropriate route; and display of a map around the present position.

The processor 5 stores the map update information read from the update DVD-ROM by the update information acquisition device 4 into the map information storage device 3; reads the map information and map update information from the map information storage device 3 when the update of the map information becomes necessary; and executes the update processing of the map information using the map update information.

The output device 6 presents various information items to the user in accordance with the map information processing results delivered from the processor 5. The output device 6 can be composed of a display device for displaying a map, the present position, route, guidance information and the like, and a voice generating device for providing the user with a speech instruction or guidance.

[1] Data Structure of Map Information

Figure 2:
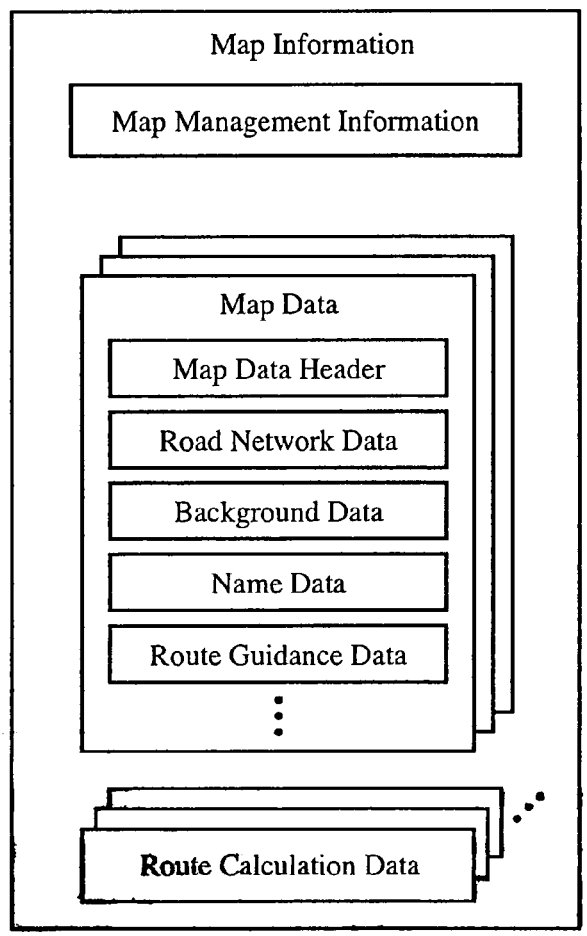
FIG. 2 is a diagram showing a schematic data structure of the map information stored in the map information storage device shown in FIG. 1.

The data structure will now be described of the map information employed by the map information processing apparatus of the embodiment 1 in accordance with the present invention. FIG. 2 shows a schematic data structure of the map information stored in the map information storage device 3. The map information includes "map management information", "map data" and "route calculation data".

The map data is arranged in layers in accordance with degrees of details of the road network, and is prepared for each of a plurality of areas for each layer, which are obtained by dividing the whole country. Each road network in each area is represented using "link strings" each of which represents a series of roads in the road network represented by "nodes" indicating points on a road, and "links" indicating roads between the points.

As the map data described above, the route calculation data is also arranged in layers in accordance with the degrees of details of the road network, and is prepared for each of the plurality of areas for each layer, which are obtained by dividing the whole country. The road network in each area is represented by the nodes and links.

The map management information is composed of the data for managing the map data and route calculation data prepared for each layer. The map management information includes for each layer the information for establishing correspondence between the areas and the map data and route calculation data; the information indicating the storage positions of the map data and route calculation data in the map information; and the information indicating data sizes. In addition, the map management information includes the version number information representing the version number of the map information.

The map data includes a "map data header", "road network data", "background data", "name data", "route guidance data" and the like. The map data header is composed of the information for managing the road network data, background data, name data, route guidance data and the like. The road network data is used for representing road shapes used for map matching and road display, and for representing road connection relationships. The background data is used for displaying map backgrounds such as rivers and oceans. The name data is used for displaying place-names and the like in letters or characters. The route guidance data is used for providing route guidance at an intersection or the like.

The route calculation data, the data representing the road network for the route calculation, has a data structure different from the road network data constituting the map data. The route calculation data includes the link numbers of the links of the road network of the map data, which correspond to the links of the road network for the route calculation, and can establish correspondence between the links of both the road networks.

Figure 3:
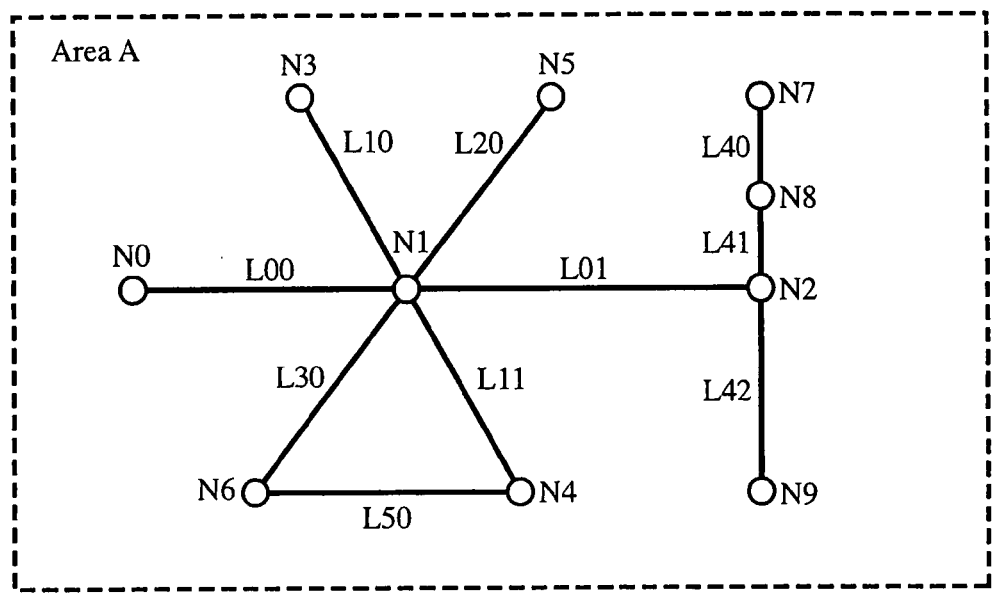
FIG. 3 is a diagram showing an example of a road network in a lowest level rectangular area representing a most detailed road network employed in the map information processing apparatus of the embodiment 1 in accordance with the present invention.
Figure 4:
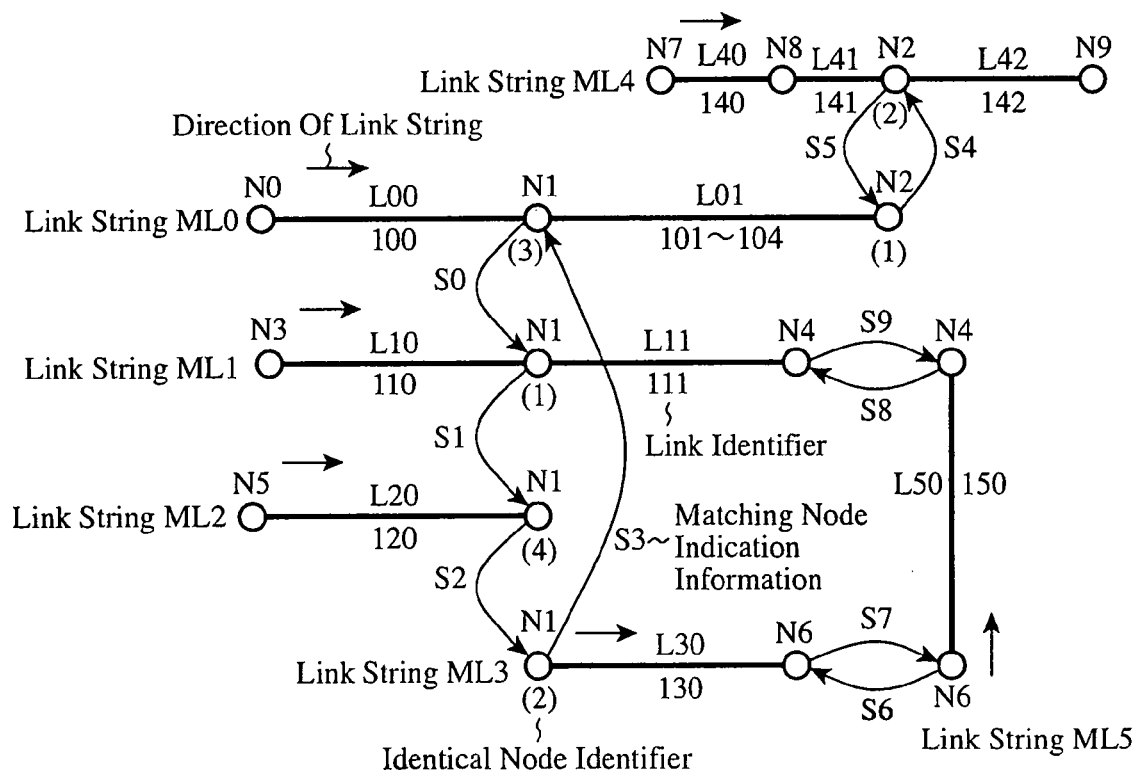
FIG. 4 is a diagram showing an example of a road network representing the road network as shown in FIG. 3 using link strings.

Next, a concrete example of the road network rendered by using the map information will be described. FIG. 3 shows a road network in a rectangular area A at the lowest level representing the most detailed road network. The road network in the area A includes nodes N0-N9 and links L00, L01, L10, L11, L20, L30, L40, L41, L42 and L50. FIG. 4 shows the road network as illustrated in FIG. 3 by using link strings. The term "link string" refers to a series of one or more links. In the road network as shown in FIG. 4, the links L00 and L01 form a link string ML0, the links L10 and L11 form a link string ML1, the link L20 forms a link string ML2, the link L30 forms a link string ML3, the links L40, L41 and L42 form a link string ML4, and the link L50 forms a link string ML5.

Each link string has a directional property, and the directional property of the link string is referred to as a "direction of the link string". For example, in the road network as shown in FIG. 4, the direction from the node N0 to N2 of the link string ML0 is defined as the direction of the link string. Likewise, each link has a directional property, which is called a "direction of the link". The direction of the link is the same as the direction of the link string to which it belongs. For example, in the road network as shown in FIG. 4, the direction of the link L00 is the same as that of the link string ML0, that is, the direction from the node N0 to node N1.

Among the two end nodes of each link and with respect to the direction of the link, an initial (downstream) side node is referred to as a starting node, and a terminal (upstream) side node is referred to as an ending node. For example, in the road network as shown in FIG. 4, the starting node of the link L00 is N0, and the ending node is N1. Among the nodes included in each link string and with respect to the direction of the link string, the node at the initial position is referred to as the initial node of the link string, and the node at the terminal position is referred to as the terminal node of the link string. For example, in the road network as shown in FIG. 4, the node N0 is the initial node of the link string ML0, and the node N2 is the terminal node of the link string ML0.

Each link is provided with a link identifier unique to the link to recognize it. The link identifier is invariable at least as long as the link is present in the map data. As the link identifier, a link identifier with a range can also used. The link identifier with a range is assigned to a link which will be divided into a plurality of links and to an upper layer link incorporating a plurality of links. For example, in the road network as shown in FIG. 4, the links L00, L10, L11, L20, L30, L40, L41 and L50 are provided with numbers "100", "110", "111", "120", "130", "140", "141", "142" and "150" as the link identifiers. In addition, the link L01 is provided with the link identifier with a range "101"-"104".

Here, consider a case where a node Nx is connected to a plurality of links and there are a plurality of link strings including these links. In this case, the plurality of link strings each include the same node Nx. On the contrary, when a plurality of link strings include the same node Nx, collecting the links connected to each node Nx of the plurality of link strings will give all the links connected to the node Nx. Accordingly, the connection relationships between the links at a node can be represented by giving identity of the node included in the different link strings.

For example, in the road network as shown in FIG. 4, by showing that the node N1 of the link string ML0, the node N1 of the link string ML1, the node N1 of the link string ML2, and the node N1 of the link string ML3 are identical, it is possible to demonstrate that the links L00, L01, L10, L11, L20 and L30 are connected at the node N1, and to express the connection relationships of the links at the node N1 in FIG. 3.

To indicate the identity of the nodes between the link strings, each node in the link strings has "matching node indication information". The matching node indication information indicates the nodes in other link strings, which agree with (are identical to) the node having the same matching node indication information. The matching node indication information items indicating the same node are defined to mutually indicate the nodes in different link strings. The information indicating the nodes in the link strings such as the matching node indication information is referred to as "node indication information".

Consider a case of starting from a node Nx of a certain link string MLx and sequentially traveling the nodes indicated by the matching node indication information. Since the matching node indication information items mutually indicate the nodes indifferent link strings, reaching the node Nx in the link string different from the link string including the node Nx passed through up to that point, and thus passing through all the link strings including the node Nx, the node Nx in the initial link string MLx is reached at last. Thus, all the identical nodes included in the plurality of link strings can be obtained by sequentially traveling the nodes indicated by the matching node indication information.

For example, in the road network as shown in FIG. 4, the matching node indication information S0 of the node N1 of the link string ML0 indicates the node N1 of another link string ML1; the matching node indication information S1 of the node N1 of the link string ML1 indicates the node N1 of another link string ML2; the matching node indication information S2 of the node N1 of the link string ML2 indicates the node N1 of another link string ML3; and the matching node indication information S3 of the node N1 of the link string ML3 indicates the node N1 of another link string ML0. These matching node indication information items S0, S1, S2 and S3 indicate the node N1 of the different link strings, respectively.

The foregoing configuration makes it possible to reach the node N1 of the link string ML1 according to the designation of the matching node indication information S0; to reach the node N1 of the link string ML2 according to the designation of the matching node indication information S1; to reach the node N1 of the link string ML3 according to the designation of the matching node indication information S2; and to reach the node N1 of the link string ML0 according to the designation of the matching node indication information S3; and thus to make a round of all the link strings ML0, ML1, ML2 and ML3 including the node N1. This enables obtaining the node N1 of the link strings ML0, ML1, ML2 and ML3.

The matching node indication information is represented by using "link indication information" representing a link identifier of a link having as its end the node that the matching node indication information indicates; and "starting-ending point indication information" representing which of the starting point side and ending point side corresponds to the node designated by the matching node indication information. For example, in the road network as shown in FIG. 4, since the matching node indication information S0 designates the starting node N1 of the link L11, "111" is used as the link indication information, and "starting point" is used as the starting-ending point indication information.

When the link identifier of the link having as its end the node designated by the matching node indication information has a range, the following link identifier is used as the link indication information: When the starting-ending point indication information designates the starting node, the link identifier having the minimum value of the range is employed; and when the starting-ending point indication information indicates the ending node, the link identifier having the maximum value of the range is employed. For example, in the road network as shown in FIG. 4, since the matching node indication information S3 designates the starting node N1 of the link L01, "101" is used as the link indication information, and "starting point" is used as the starting-ending point indication information. In contrast, since the matching node indication information S5 designates the terminal node N2 of the link L01, "104" is used as the link indication information, and "ending point" is used as the starting-ending point indication information.

To identify the identical nodes included in the link strings, proper and invariable identical node identifiers are provided to the identical nodes. For example, in the road network as shown in FIG. 4, the node N1 of the link string ML0, the node N1 of the link string ML1, the node N1 of the link string ML2 and the node N1 of the link string ML3 are provided with the numbers "3", "1", "4" and "2", respectively, as the identical node identifiers. Likewise, the node N2 of the link string ML0 and the node N2 of the link string ML4 are provided with the numbers "1" and "2", respectively, as the identical node identifiers.

Figure 5:
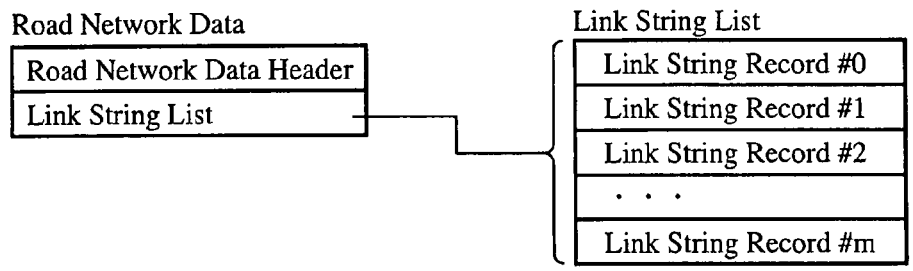
FIG. 5 is a diagram showing an example of the data structure of the road network data employed in the map information processing apparatus of the embodiment 1 in accordance with the present invention.

FIG. 5 shows a data structure of the road network data representing the road network. The road network data consists of a "road network data header" and a "link string list". The road network data header stores information for managing the road network data such as the data size of the road network data and the number of link string records stored in the link string list. The link string list consists of a set of the link string records provided in correspondence to the link strings constituting the road network represented by the road network data. The link string records are arranged in ascending order of the values of the link identifiers of the links included in the link strings.

Figure 8:
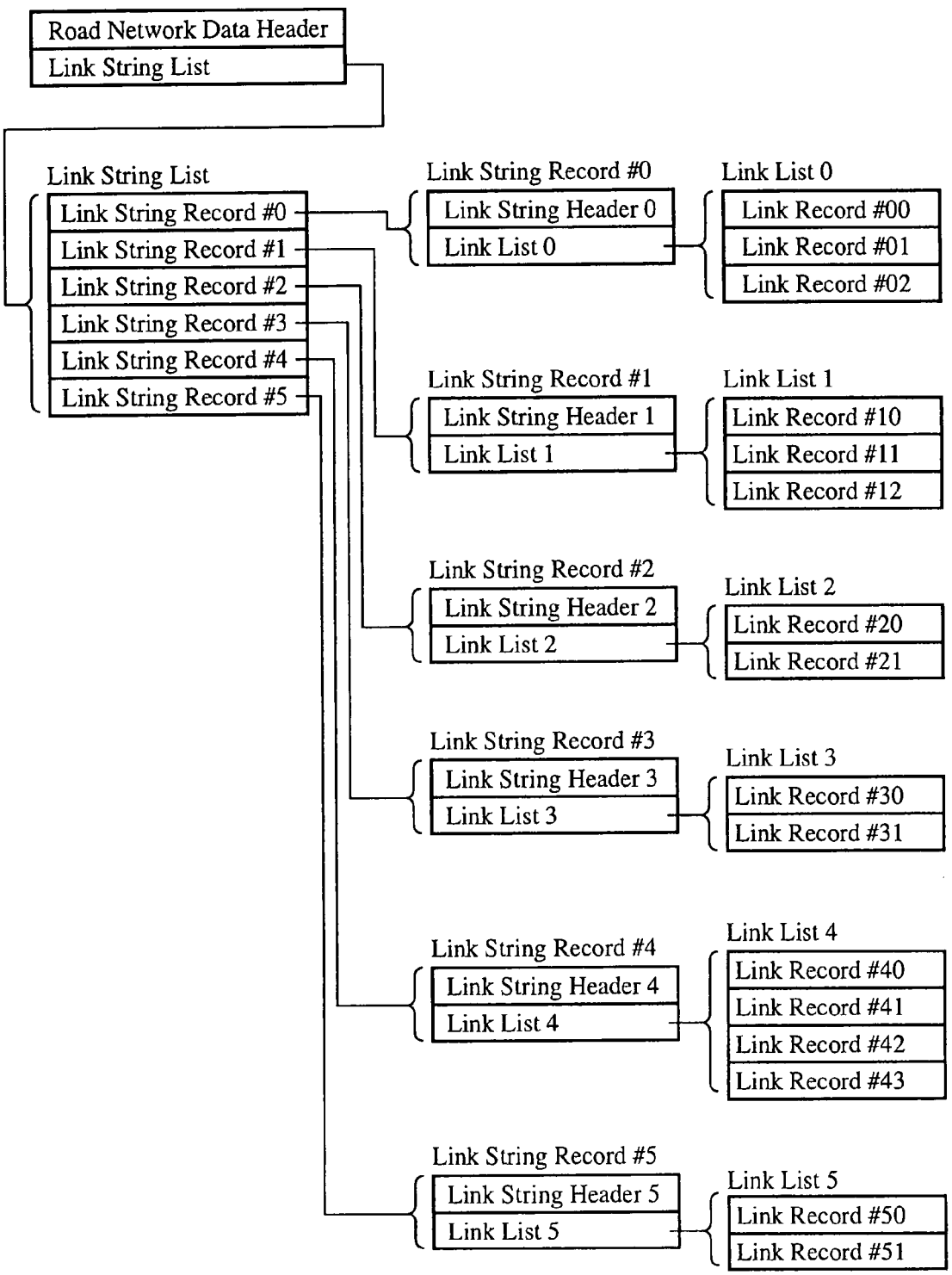
FIG. 8 is a diagram showing an example of the road network data representing the road network as shown in FIG. 4.

FIG. 8 is an example of the road network data representing the road network as shown in FIG. 4. The link string list representing the road network consists of a link string record #0, link string record #1, link string record #2, link string record #3, link string record #4 and link string record #5 corresponding to the link strings ML0, ML1, ML2, ML3, ML4 and ML5, respectively. The ranges of the link identifiers of the link strings ML0, ML1, ML2, ML3, ML4 and ML5 are "100"-"104", "110"-"111", "120"-"120", "130"-"130", "140"-"142" and "150", respectively. The link string records are arranged in ascending order of the values of the link identifiers.

Figure 6:
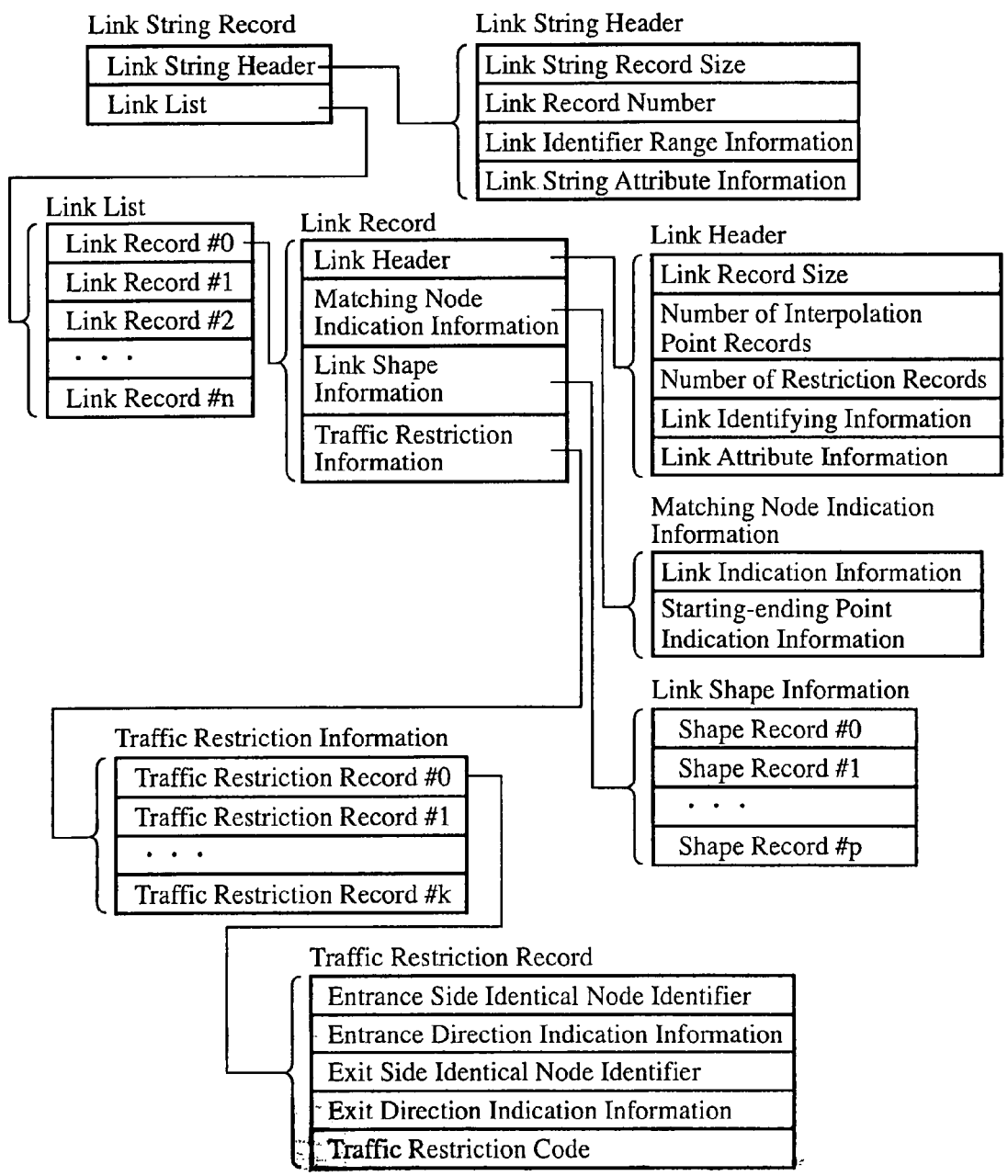
FIG. 6 is a diagram showing an example of the data structure of a link string record shown in FIG. 5.

FIG. 6 shows an example of the data structure of the link string records shown in FIG. 5. Each link string record consists of a "link string header" and a "link list". The link string header consists of a "link string record size" representing the data size of the link string record; a "link record number" representing the number of the link records provided in the link string record; "link identifier range information" representing the range (minimum value and maximum value) of the link identifiers of the links included in the link string corresponding to the link string record; and "link string attribute information" representing road types, route number and the like of the link string corresponding to the link string record.

The link list consists of a set of the link records provided in correspondence to the links constituting the link string corresponding to the link string record. The link records are arranged in such a manner that the order of the links corresponding to the link records agrees with the order of the links when the link string is traced in the forward direction of the link string.

In the road network data, a terminal virtual link, a virtual link that makes the terminal node of the link string the starting node, is defined, and the link record for the terminal virtual link is placed at the final position of the link list. For example, for the link string ML0 of the road network as shown in FIG. 4, FIG. 8 shows the link list including the link record #00 and link record #01 corresponding to the link L00 and L01, and the link record #02 corresponding to the terminal virtual link having the terminal node N2 of the link string ML0 as the starting node. These link records are arranged in order of the link record #00, link record #01 and link record #02.

As shown in FIG. 6, each link record consists of a "link header", "matching node indication information", "link shape information" and "traffic restriction information".

The link header consists of information for managing link record such as a "link record size" representing the data size of the link record; "the number of interpolation point records" representing the number of shape records constituting the link shape information; "the number of restriction records" constituting the traffic restriction information; "link identifying information" representing the link identifier of the link; and "link attribute information" representing various attributes such as link types indicating characteristics on the road structure like the road width of the link, the number of lanes, one-way traffic restrictions and a separate/inseparate state of up and down lanes, boundary information designating whether the link starting point side abuts on a boundary of an area represented by the road network data, and guidance presence/absence information indicating the presence or absence of the guidance information about the starting node.

When the link identifier has a range, the minimum value of the link identifier is represented by the link identifying information about the link record of the link, and the maximum value of the link identifier is obtained by subtracting a value "1" from the value of the link identifier represented by the link identifying information of the next link record. As for the maximum value of the link identifier when the link is the terminal link of the link string, it is obtained from the maximum value of the link identifier range information of the link string header.

The matching node indication information, which represents the matching node indication information assigned to the starting node of a link, consists of the link indication information and the starting-ending point indication information as mentioned above. When the node corresponding to the starting node of the link is not present in the other link strings, a value "−1", which is not assigned to any links as the link identifier, is used as the link indication information. For example, in FIG. 8 concerning the road network as shown in FIG. 4, the matching node indication information about the link record #01 of the link L01 of the link string ML0 employs the link identifier "111" of the link L11 as the link indication information, and the value representing the starting point side as the starting-ending point indication information, thereby representing the matching node indication information S0. Likewise, the matching node indication information about the link record #42 of the link L42 of the link string ML4 employs the link identifier "104" of the link L01 as the link indication information, and the value representing the ending point side as the starting-ending point indication information, thereby representing the matching node indication information S5.

As for the link shape information, when the road shape of the links is represented by a zigzag line approximating the centerline of the road, it consists of a set of shape records provided in correspondence to the starting node side end point and vertices of the zigzag line.

The traffic restriction information, which includes information representing restrictions across the links at the starting node of the link, consists of a set of traffic restriction records provided in correspondence to the restrictions. The traffic restriction information is provided in one of the identical nodes included in a plurality of link strings. The traffic restriction record consists of an "entrance side identical node identifier" representing the identical node identifier of the starting node of the entrance link; "entrance direction indication information" designating whether the entrance direction to the node the entrance side identical node identifier designates is in the same or opposite direction to the direction of the link string including the node the identical node identifier designates; an "exit side identical node identifier" indicating the identical node identifier of the starting node of the exit link; "exit direction indication information" designating whether the exit direction from the node the exit side identical node identifier designates is in the same or opposite direction to the direction of the link string including the node the identical node identifier designates; and "traffic restriction code" representing traffic restriction contents from the entrance link to the exit link.

Figure 9:
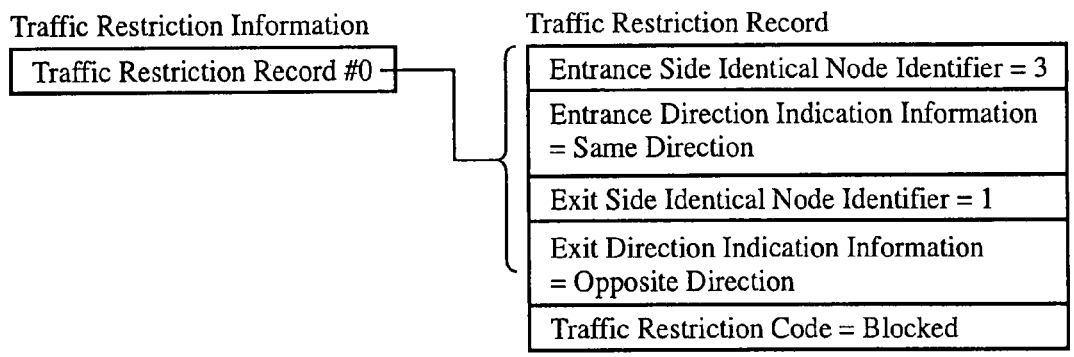
FIG. 9 is a diagram showing an example of traffic restriction information when traffic restrictions on the road network as shown in FIG. 4 are imposed.

FIG. 9 is an example of the traffic restriction information assigned to the link record #01 of the link L01 of the link string ML0 when the restriction is imposed to the traffic entering from the link L00 and exiting to the link L10 in the road network as shown in FIG. 4. In this example, the traffic restriction record for the traffic restriction stores the identical node identifier "3" of the node N1 of the link string ML0 as the entrance side identical node identifier; stores a value representing the same direction as the entrance direction indication information for entering from the same direction as the link string ML0 to the node N1 of the link string ML0; stores a value "1" which is the identical node identifier of the node N1 of the link string ML1 as the exit side identical node identifier; stores a value representing the opposite direction as the exit direction indication information for exiting from the node N1 of the link string ML1 in the direction opposite to the link string ML0; and stores the code representing the restriction as the traffic restriction code, for example.

Figure 7:
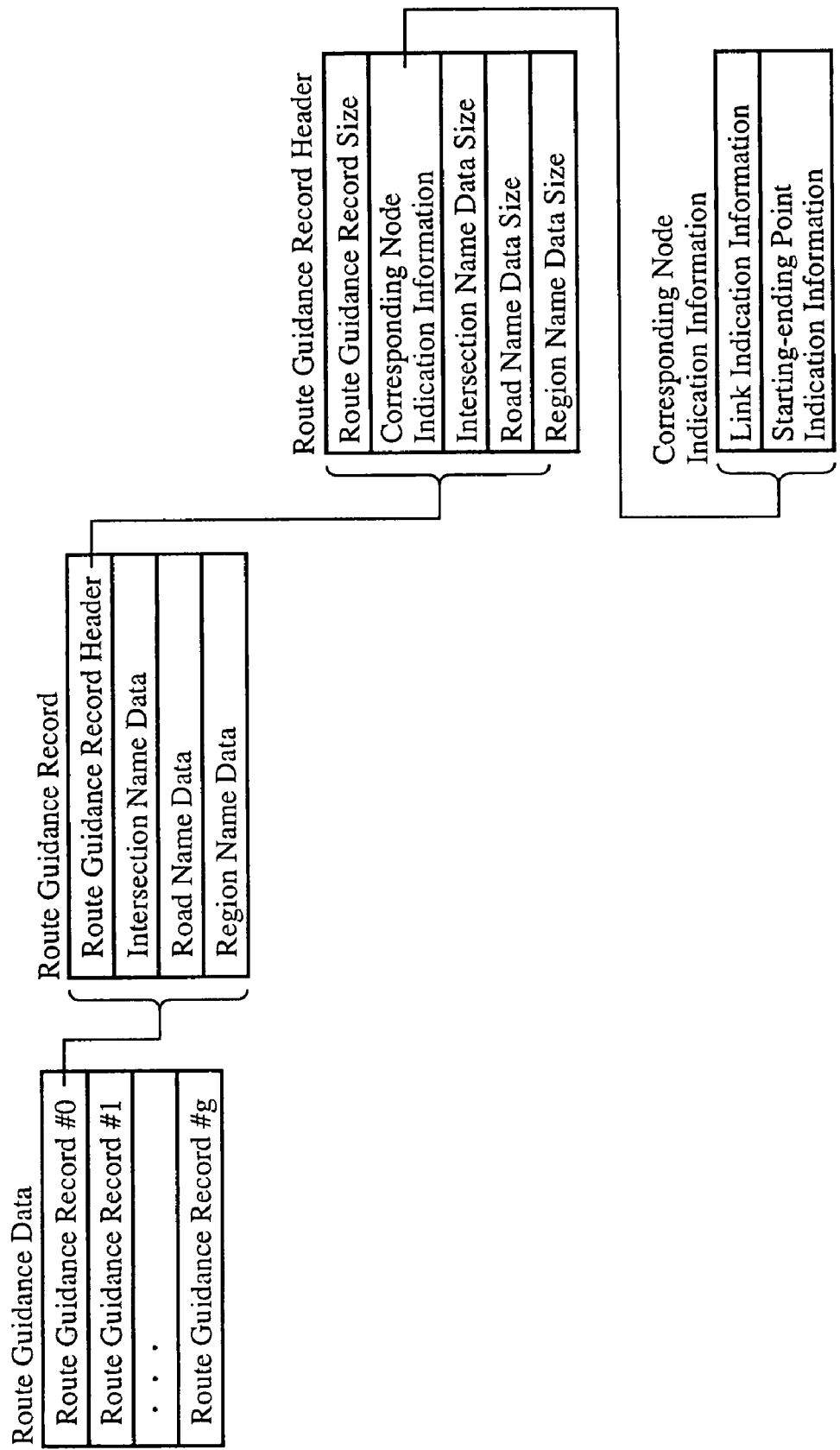
FIG. 7 is a diagram showing an example of the data structure of the route guidance data employed in the map information processing apparatus of the embodiment 1 in accordance with the present invention.

Next, the route guidance data will be described. FIG. 7 shows a data structure of the route guidance data. The route guidance data consists of a set of the route guidance records provided in correspondence to the node. The information associated with the node such as the route guidance record is referred to as the "node related information".

The route guidance record includes various data necessary for the guidance at the node such as a "route guidance record header", "intersection name data" representing the intersection name of the node, "road name data" representing the road name of the link connected to the node, and "region name data" representing the destination of the link connected to the node.

The route guidance record header consists of "route guidance record size" indicating the data size of the route guidance record; "corresponding node indication information" indicating the corresponding node; "intersection name data size" indicating the size of the intersection name data; "road name data size" indicating the size of the road name data; and "region name data size" indicating the region name data.

The corresponding node indication information, which indicates the node to be associated with the route guidance record, consists of link indication information representing the link identifier of the link having the corresponding node as its end point; and starting-ending point indication information representing whether the corresponding node is the starting node or ending node of the link represented by the corresponding link indication information. The corresponding node indication information, which indicates the node of the link string, is one of the node indication information.

Thus, the data for establishing correspondence between the node and the route guidance record is held not on the road network data side but on the route guidance data side. Accordingly, as for the data establishing correspondence between the node and the route guidance record, the update of the route guidance data does not affect the road network data.

In addition, since the link identifier employed by the corresponding node indication information is invariable, the corresponding node indication information of the route guidance record does not change in spite of the elimination or addition of a link other than the link represented by the link indication information or the elimination or addition of the link string including the links other than the link represented by the link indication information. Thus, it is not necessary to update the corresponding node indication information of the route guidance record when updating the road network as described above. The route guidance records are arranged in ascending order of the values of the link identifiers the link indication information represents, which can facilitate the search for the route guidance record using the link identifier.

Figure 10:
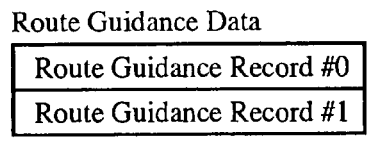
FIG. 10 is a diagram showing an example of the route guidance data including a route guidance record as the node related information about the road network of FIG. 4.

FIG. 10 shows an example of the route guidance data having the route guidance record #0 and route guidance record #1 assigned to the node N1 of the link string ML2 and the node N2 of the link string ML4 as the node related information in the road network of FIG. 4. In this example, for the corresponding node indication information of the route guidance record #0, a value "120" which is the link identifier of the link L20 is used as the link indication information and a value representing the ending point is used as the starting-ending point indication information. Likewise, for the corresponding node indication information of the route guidance record #1, a value "142" which is the link identifier of the link L42 is used as the link indication information and a value representing the starting point is used as the starting-ending point indication information. The route guidance record #0 and the route guidance record #1 are stored in this order so that the values of the link identifiers the link indication information represents are arranged in ascending order. Incidentally, as for the link record #01 of the terminal virtual link having the node N1 of the link string ML2 as the starting point and the link record #42 of the link L42 having the node N2 of the link string ML4 as the starting point, the link attribute information of the link header of each of them has the guidance presence/absence information storing a value indicating that the guidance information is "present".

[2] Data Structure of Map Update Information

Figure 11:
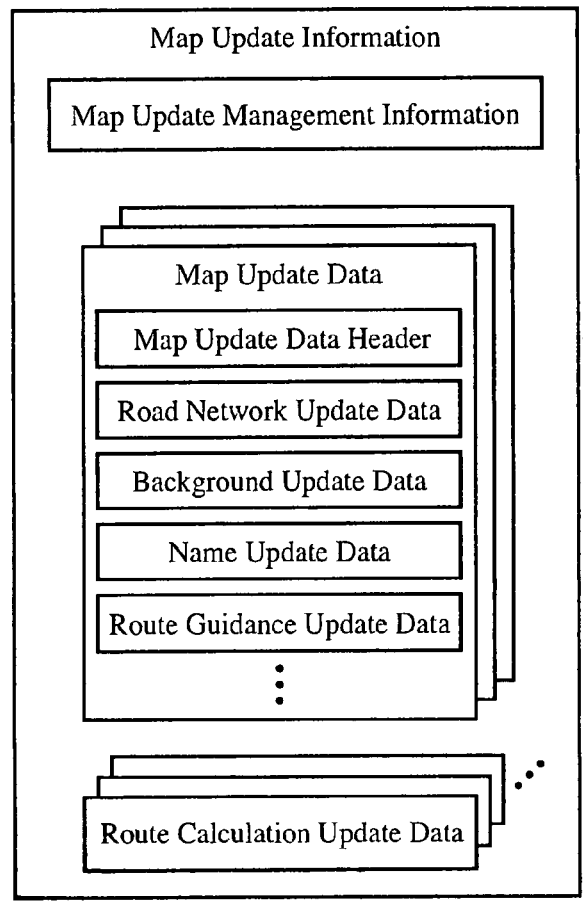
FIG. 11 is a diagram showing a schematic data structure of the map update information stored in an update DVD-ROM to be inserted into the update information acquisition device shown in FIG. 1.

The data structure will be described of the map update information for updating the map information employed by the map information processing apparatus of the embodiment 1 in accordance with the present invention. FIG. 11 is a diagram schematically showing the data structure of the map update information stored in an update DVD-ROM inserted into the update information acquisition device 4. The map update information consists of "map update management information", "map update data" and "route calculation update data".

The map update management information is composed of data for managing the map update data on a layer by layer basis, and includes information for establishing correspondence between the areas and the map update data and route calculation update data in each layer; information indicating the storage positions of the map update data and route calculation update data in the map update information; and information indicating the data size. In addition, the map update management information includes "data identifying information" indicating that the DVD-ROM stores the map update information; "update target version number information" indicating the version number of the map information to be updated by the map update information; and "update version number information" indicating the version number of the map information obtained by updating by the map update information.

The map update data, the data for updating the map data, is provided in correspondence to the map data. The map update data corresponding to the map data that does not require update is not included in the map update information. The route calculation update data, the data for updating the route calculation data, is provided in correspondence to the route calculation data. The route calculation update data corresponding to the route calculation data that does not require update is not included in the map update information.

The map update data includes, in addition to a map update data header, the road network update data, background update data, name update data, route guidance update data and the like (generally referred to as "update data") for updating the road network data, background data, name data, route guidance data and the like. The update data corresponding to the road network data, background data, name data or route guidance data that does not require update is not included in the map update information. Each update data is composed of one or more update records.

Figures 12, 13:
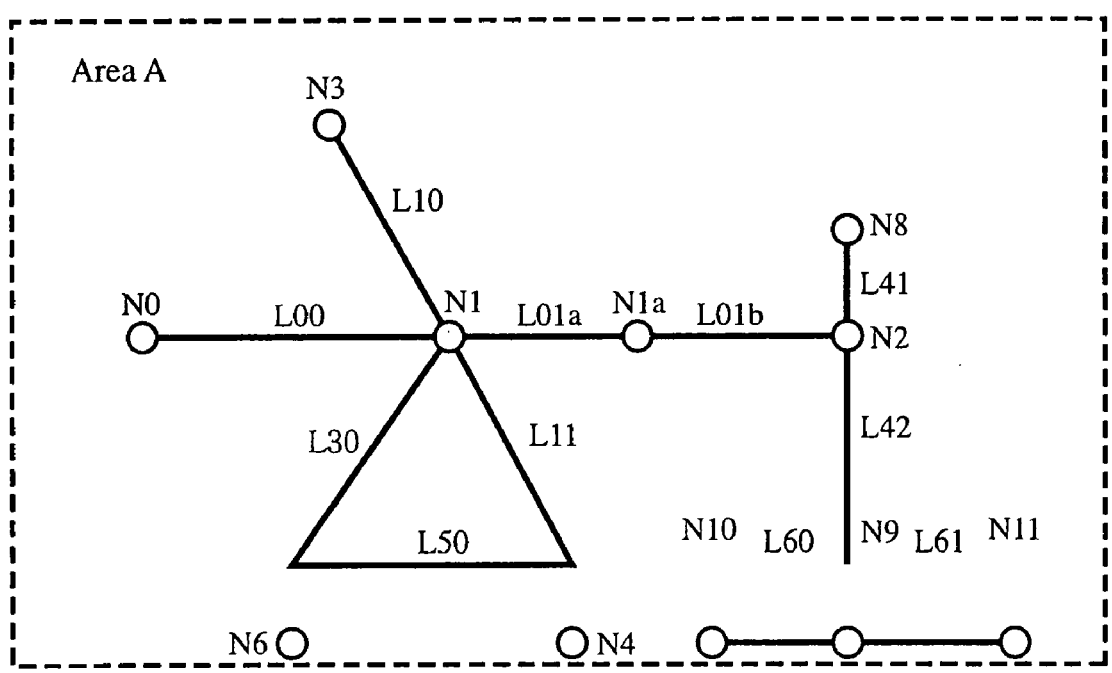
FIG. 12 is a diagram showing an example of the data structure of an update record constituting the update data as shown in FIG. 11.
FIG. 13 is a diagram showing a road network obtained by updating the road network as shown in FIG. 3.

FIG. 12 is a diagram showing an example of the data structure of the update record. The update record is composed of an "update record size", "update target data type", "update operation type", "update target designation" and "update operand". The update record size indicates the data size of the update record. The update target data type indicates the type of the data constituting the road network data, background data, name data, route guidance data and the like to be updated by the update record. The update operation type indicates the update operation type such as overwriting, deletion, replacement and addition to the data indicated by the update target data type and the update target designation. The update target designation indicates an update portion in the data indicated by the update target data type. The update operand indicates the data to be overwritten, replaced or added in accordance with the update operation type, and its data size. In addition, the update operand indicates the initial position of the overwriting or replacement by the address with reference to the initial position of the data designated by the update target data type and update target designation. When the update operation type is deletion, the update operand is not provided.

The map update data header, which is the data for managing the map update data header, road network update data, background update data, name update data, route guidance update data and the like, includes information representing the storage position, data size, update record number and the like of the map update data in each update data.

Next, an update example of the road network will be described. FIG. 13 shows a road network obtained by updating the road network as shown in FIG. 3. The road network shown in FIG. 13 is formed by eliminating the nodes N5 and N7 and the links L20 and L40 from the road network as shown in FIG. 3, by adding a node N10, a node N11, a link L60 and a link L61, by dividing the link L01 into a link L01a and a link L01b, and by adding a node N1a to the dividing point.

Figure 14:
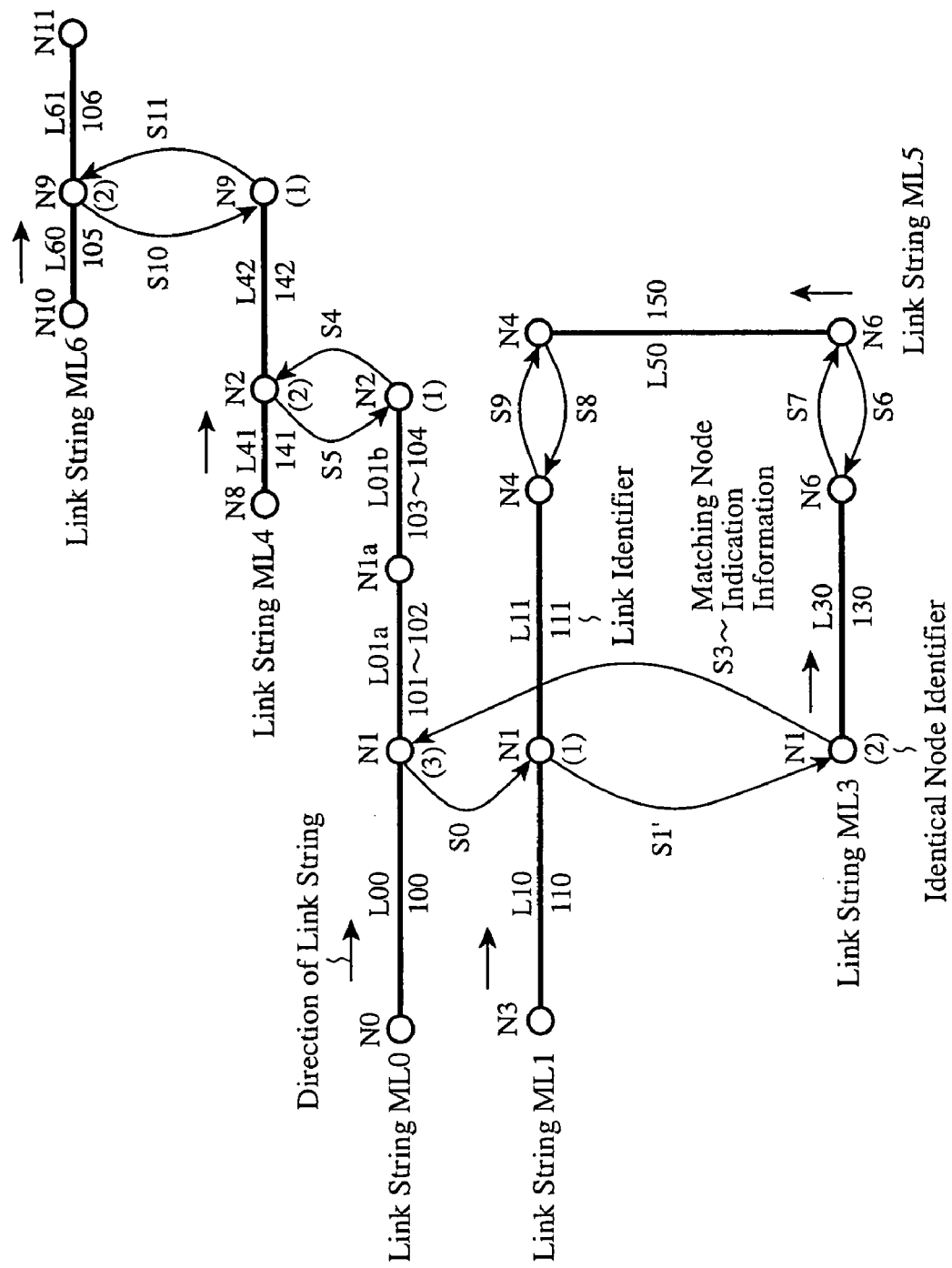
FIG. 14 is a diagram showing the road network as shown in FIG. 3 by using link strings.

FIG. 14 shows the road network as illustrated in FIG. 13 represented by using link strings. The road network as shown in FIG. 14 is obtained by eliminating the link string ML2 from the road network of FIG. 4, by eliminating the node N7 and the link L40 of the link string ML4, by adding a link string ML6, by replacing the link L01 of the link string ML0 by the link L01a and link L01b, by providing "101"-"102" as the link identifier of the link L01a, and by providing "103"-"104" as the link identifier of the link L01b.

Figures 15, 16:
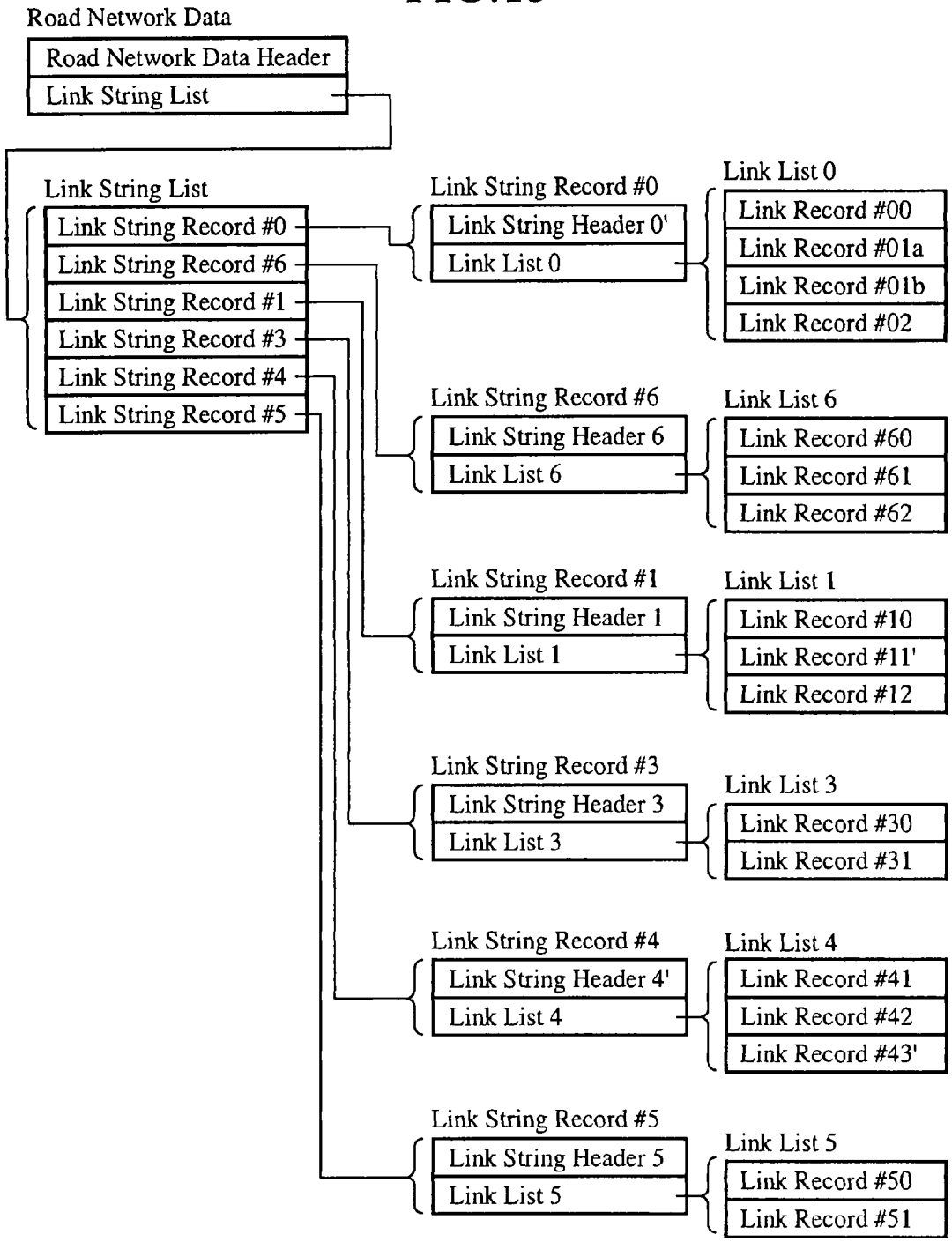
FIG. 15 is a diagram showing an example of the road network data representing the road network as shown in FIG. 14.
FIG. 16 is a diagram showing an example of the route guidance data obtained by updating the route guidance data as shown in FIG. 7.

Next, an update example of the road network data among the update of the road network will be described. FIG. 15 is an example of the road network data representing the road network as shown in FIG. 14. The road network data is obtained by updating the road network data shown in FIG. 8 as follows. More specifically, compared with the link string list shown in FIG. 8, the link string list shown in FIG. 15 is formed by deleting the link string record #2 according to the elimination of the link string ML2, and by inserting the link string record #6 representing the link string ML6 before the link string record #1 according to the addition of the link string ML6 in such a manner that the link records are arranged in ascending order of the range of the link identifiers.

In addition, as compared with the link list 0 shown in FIG. 8, the link list 0 of the link string record #0 shown in FIG. 15 is formed by deleting the link record #01 according to the division of the link L01, and by inserting the link record #01a of the link L01a and the link record #01b of the link L01b. Besides, compared with the link list 4 of FIG. 8, the link list 4 of the link string record #4 shown in FIG. 15 is formed by deleting the link record #40 according to the elimination of the link L40.

The road network data header', link string header 0' and link string header 4' shown in FIG. 15 are alternations from the road network data header, link string header 0 and link string header 4 shown in FIG. 8. They are modified in such a manner as to reflect the update as described above. The link record #11' shown in FIG. 15 is an alternation from the link record #11 shown in FIG. 8 in connection with the elimination of the link string ML2. The link record #11' is modified in such a manner that its matching node indication information indicates the node N1 of the link string ML3 as the identical node of the node N1 of the link string ML1.

The link record #43' shown in FIG. 15 is an alternation from the link record #43 shown in FIG. 8. The link record #43' is modified in such a manner that its matching node indication information indicates the node N9 of the link string ML6. In addition, the matching node indication information of the link record #63 shown in FIG. 15 is established in such a manner as to indicate the node N9 of the link string ML4. In this way, the matching node indication information of the link record #43' in FIG. 15 and that of the link record #62 in FIG. 15 indicate that the node N9 of the link string ML4 and the node N9 of the link string ML6 are an identical node.

In FIG. 14, the matching node indication information S0, S3, S4 or S5 is unchanged because the minimum value of the link identifier of the link L01a, the maximum value of the link identifier of the link L01b and the link identifiers of the link L11 and L42 are invariant at the time of the update of the road network. Thus, it is not necessary to update the matching node indication information representing them. As for the identical node identifier of each node N1 of the link strings ML0, ML1 and ML3, they are invariant at the time of update of the road network. Accordingly, the traffic restriction information (see FIG. 9) assigned to the link record #01 of the link L00 of the link string ML0 is unchanged by the foregoing update, and its update is unnecessary.

Next, an example of the update of the route guidance data will be described. As for the route guidance data as shown in FIG. 16, the route guidance for the node N1 of the link string ML2 is eliminated in connection with the elimination of the link string ML2, and its node related information, the route guidance record #0 (see FIG. 10), is deleted from the route guidance data.

Next, an example of the road network update data will be described. FIG. 17 shows an example of the road network update data used for updating the road network data as shown in FIG. 8 to the road network data as shown in FIG. 15. In FIG. 17, the term "link string number" means an order of the link string records in their arrangement in the link string list with the initial value of the link string records being made "0". Likewise, the term "link number" means an order of the link records in their arrangement in the link list with their initial value being made "0". The link string record and link record to be updated are designated by the link string number and link number which are set by the update target designation. In FIG. 17, the description about the data size and initial position of the update operand will be omitted.

Each of the update records shown in FIG. 17 will now be described.

(1) The update record #r1 instructs to overwrite the link string header 0 shown in FIG. 8 with the link string header 0' shown in FIG. 15 which reflects the deletion of the link record #01 and the insertion of the link record #01a and link record #01b.

(2) The update record #r2 instructs to delete the link record #01 from the link list 0 shown in FIG. 8.

(3) The update record #r3 instructs to insert the link record #01a and link record #01b before the link record #2 of the link list 0 shown in FIG. 8.

(4) The update record #r4 instructs to insert the link string record #6 of FIG. 15 before the link string record #1 shown in FIG. 8.

(5) The update record #r5 instructs to overwrite the matching node indication information of the link record #01 of the link list 1 shown in FIG. 8 with the matching node indication information representing the matching node indication information S1' indicating the node N1 of the link string ML3.

(6) The update record #r6 instructs to delete the link string record #2 shown in FIG. 8.

(7) The update record #r7 instructs to overwrite the link string header 4 of the link string record #4 as shown in FIG. 8 with the link string header 4' shown in FIG. 15.

(8) The update record #r8 instructs to delete the link record #40 of the link list 4 shown in FIG. 8.

(9) The update record #r9 instructs to overwrite the matching node indication information of the link record #03 of the link list 4 shown in FIG. 8 with the matching node indication information representing the matching node indication information S11 indicating the node N9 of the link string ML6.

Next, the route guidance update data will be described. FIG. 18 shows an example of the route guidance update data for updating the route guidance data as shown in FIG. 10 to the route guidance data as shown in FIG. 16. In the route guidance update data, an update record #g0 indicates to delete the route guidance record #0 shown in FIG. 10.

Here, the reason that the foregoing data structure can reduce the amount of the update data will be described. As described above, the elimination of the link string ML2 and the link L40 and the addition of the link string ML6 do not change the link identifiers. Accordingly, the matching node indication information items S0, S8, S6, S9 and S7 are invariant which indicate the nodes unrelated to the eliminated or added link or link string, namely, the nodes without having the matching node indication information indicating the nodes included in them, that is, the nodes N1 and N4 of the link string ML1, the node N6 of the link string ML3, and the nodes N4 and N6 of the link string ML5. Accordingly, it is not necessary for the road network update data shown in FIG. 17 to include update records for updating the matching node indication information resulting from the elimination or addition of the unrelated link or link string. Thus, the data structure can reduce the amount of update data of the road network as compared with the conventional data structure.

In addition, even when the link L01 is divided, the minimum value of the link identifier of the link L01a and the maximum value of the link identifier of the link L01b are unchanged. Accordingly, the matching node indication information S3 and S5 which indicate the nodes N1 and N2 of the link string ML0 are kept. Accordingly, it is not necessary for the road network update data shown in FIG. 17 to include update records for updating the matching node indication information resulting from the link division. Thus, the data structure can reduce the amount of update data of the road network.

Furthermore, as the matching node indication information S5 of the node N2 of the link string ML4 shown in FIG. 4, the matching node indication information can include the starting-ending point indication information. This enables the link indication information to designate the terminal node of the link string as the identical node. Thus, it becomes possible for all the nodes of the road network to represent the identity of the node by using the link identifier. This offers an advantage of being able to reduce the amount of update data of the road network as described above.

As described above, the identical node identifier of each node N1 of the link strings ML0, ML1 and ML3 is invariant to the elimination of the link string ML2 unrelated to the traffic restriction information shown FIG. 9. Accordingly, the entrance side identical node identifier and exit side identical node identifier of the traffic restriction record #0 assigned to the link record #01 of the link L01 of the link string ML0 are unchanged, and their update data are not necessary. Thus, it is not necessary for the road network update data shown in FIG. 17 to include the update records of the traffic restriction information resulting from the update of the link string unrelated to the traffic restriction information shown in FIG. 9. This makes it possible to reduce the amount of update data of the road network.

In addition, as described above, when deleting the route guidance record #0 of the route guidance data as shown in FIG. 10, the storage position of the route guidance record #1 changes. Conventionally, to establish correspondence between the node and the route guidance record, the storage position of the corresponding route guidance record is held on the road network data side, which makes it necessary to update the storage position even though the route guidance record #1 itself is not updated. This brings about the update data that is unnecessary primarily. In contrast with this, the present embodiment 1 does not hold the storage position of the corresponding route guidance record on the road network data side, which makes the foregoing update unnecessary. Thus, it is not necessary for the road network update data shown in FIG. 17 to include the update record for updating the storage position. This enables reducing the amount of update data of the road network.

Furthermore, as described above, despite the elimination of the link string ML2 and link L40 and the addition of the link string ML6, since the invariant link identifier is used as the corresponding node indication information, it is not necessary to alter the corresponding node indication information of the route guidance record #1 unrelated to them. Accordingly, the route guidance update data shown in FIG. 18 need not include the update record resulting from the update of the link string or link unrelated to the route guidance data. Thus, the amount of update data of the road network can be reduced.

Figure 19:
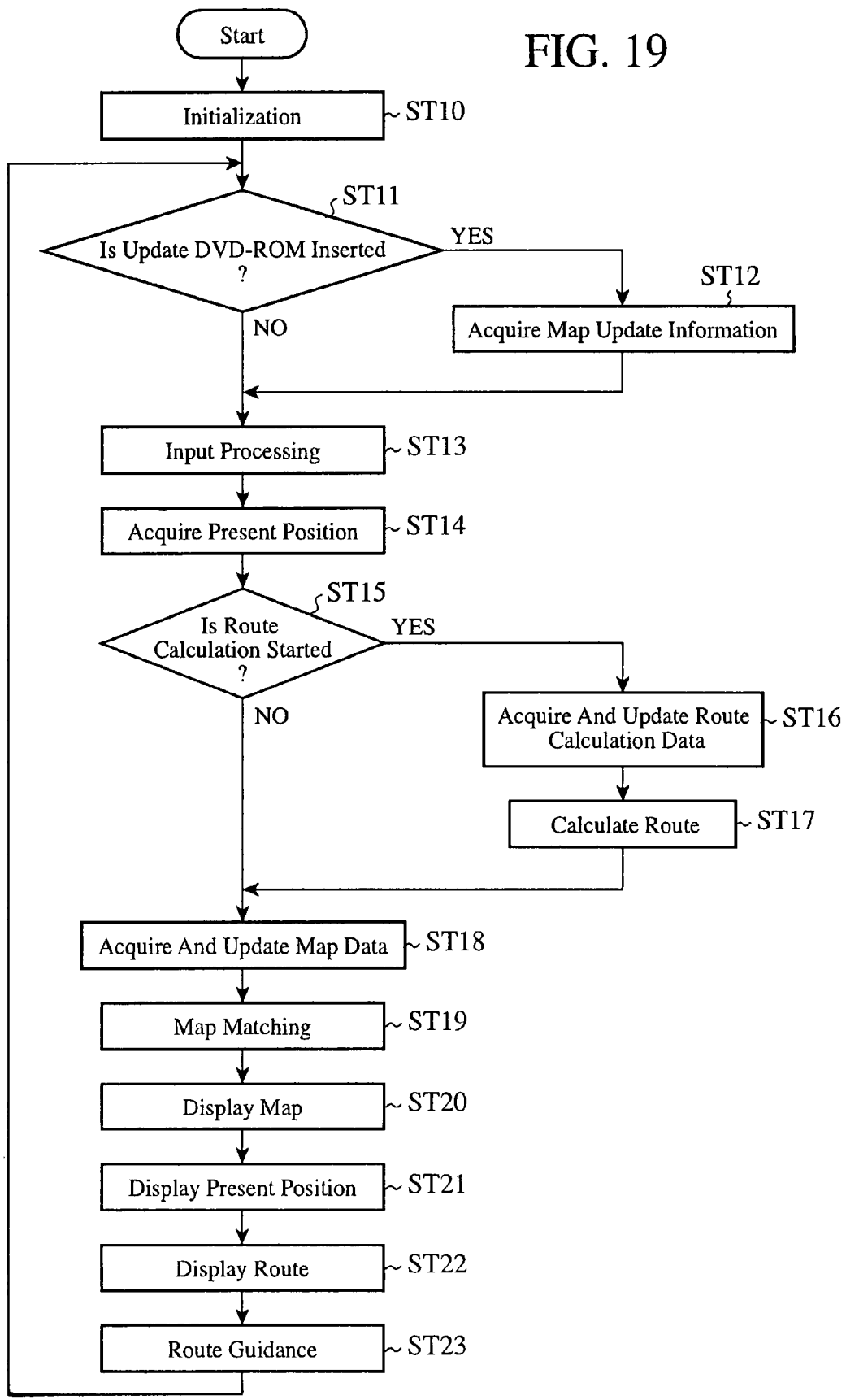
FIG. 19 is a flowchart illustrating the operation of the map information processing apparatus of the embodiment 1 in accordance with the present invention.

Next, the operation of the map information processing apparatus for updating the map information with the foregoing data structure will be described with reference to the flowchart shown in FIG. 19. The following description will be made by way of example that updates the road network data shown in FIG. 8 and the route guidance data shown in FIG. 10 to the road network data shown in FIG. 15 and the route guidance data shown in FIG. 16, thereby updating the road network shown in FIG. 4 to the road network shown in FIG. 14.

FIG. 20 is a diagram showing the allocation of a memory (not shown) of the processor 5. To the memory are assigned an operation control data section 10 for storing the data for controlling the operation of the map information processing apparatus; a traveling locus data section 11 for storing traveling locus data which is a time series of the position information obtained by the position detecting device 2; a present position data section 12 for storing the data representing the present position of the vehicle; a route data section 13 for storing the route data representing the route from the starting point to the destination; a required route calculation data management section 14 for storing required route calculation management data; a route calculation data section 15 for storing the route calculation data; a route calculation update data section 16 for storing the route calculation update data; a required map data management section 17 for storing the required map management data; a map data section 18 for storing the map data; and a map update data section 19 for storing the map update data.

First, the initialization is carried out (step ST10). Subsequently, it is checked whether the update DVD-ROM is inserted into the update information acquisition device 4 or not (step ST11). If a decision is made at step ST11 that the update DVD-ROM is inserted, the map update information is obtained (step ST12). More specifically, the processor 5 reads the map update management information of the map update information stored in the update DVD-ROM inserted into the update information acquisition device 4. In addition, it reads the map management information of the map information stored in the map information storage device 3. Then the processor 5 compares the update target version number information contained in the map update management information read with the version number information contained in the map management information. If they agree, the processor 5 makes a decision that the update of the map information by the map update information is possible, and reads the map update information from the update DVD-ROM and stores it in the map information storage device 3. After that, the sequence proceeds to step ST13. Unless a decision is made at step ST11 that the update DVD-ROM is inserted, the sequence proceeds to step ST13 without carrying out the update map information acquisition.

At step ST13, input processing is carried out. More specifically, receiving the instruction signal based on the operation or instruction of the user from the input device 1, the processor 5 generates in response to the instruction signal the data for controlling the operation of the map information processing apparatus such as a reduced scale of the map display, a destination and a start instruction of the route calculation, and stores the data in the operation control data section 10. Subsequently, the present position is obtained (step ST14). More specifically, the processor 5 obtains the position information from the position detecting device 2, and cumulatively stores the obtained position information in the traveling locus data section 11. In addition, at the initial processing at step ST14, the processor 5 stores the obtained position information in the present position data section 12 as the present position.

Subsequently, it is checked whether the start of the route calculation is instructed or not (step ST15). More specifically, according to the data stored in the operation control data section 10, the processor 5 checks whether the start of the route calculation is instructed or not. If a decision is made that the start of the route calculation is instructed, the sequence proceeds to step ST16. Unless a decision is made that the start of the route calculation is instructed, the sequence proceeds to step ST18.

At step ST16, the acquisition and update of the route calculation data is carried out. More specifically, the processor 5 reads the position information stored in the present position data section 12, and stores it into the operation control data section 10 as the starting point. Then, it carries out the acquisition and update of the route calculation data required for the route calculation to obtain the appropriate route from the starting point stored in the operation control data section 10 to the destination. Subsequently, the route calculation is carried out (step ST17). More specifically, the processor 5 obtains the appropriate route from the starting point to the destination by carrying out the route calculation using the route calculation data obtained and updated at step ST16, and stores the route data representing the route into the route data section 13. In addition, the processor 5 cancels the instruction to start the route calculation stored in the operation control data section 10. After that, the sequence proceeds to step ST18.

At step ST18, the map data acquisition and update is carried out. More specifically, the processor 5 obtains the map data required for the map display around the present position, which is indicated by the position information stored in the present position data section 12, and the map data required for the map matching and route guidance. Then it updates the map data with storing the obtained map data into the map data section 18. The processing executed at step ST18 will be described in more detail later.

Subsequently, the map matching is made (step ST19). More specifically, according to the traveling locus data stored in the traveling locus data section 11 and the road network data contained in the map data stored in the map data section 18, the processor 5 estimates the link the vehicle travels and the position on that link, obtains the present position of the vehicle, and stores the present position obtained into the present position data section 12. The estimation of the link and the position on the link is carried out in accordance with the relationships between the traveling locus data and the link or the shape of a series of links. Using the connection relationships of the links in this way will further improve the estimation accuracy of the link.

In the foregoing map matching, the link shape is obtained from the link shape information in the link record. In addition, the connection relationships between the links are obtained from the matching node indication information in the link records. More specifically, by sequentially following the identical nodes in accordance with the indication of the matching node indication information, all the identical nodes are obtained, and the links having the obtained nodes as the starting or ending points are decided as the interconnected links. If no link can be identified, the newest position information stored in the traveling locus data section 11 is stored in the present position data section 12 as the present position.

When obtaining each link with the link identifier indicated by the link indication information in the foregoing processing that sequentially follows the identical nodes in accordance with the indication of the matching node indication information, the link string record including the link identifier is obtained, and the link record with the link identifier indicated by the link indication information is obtained from among the link list contained in the link string record obtained. In this case, since the link string records are arranged in ascending order of the ranges of the link identifiers of the links included in the link string, the target link string record can be searched for more quickly.

Subsequently, the map display is carried out (step ST20). More specifically, according to the road network data, background data and name data contained in the map data stored in the map data section 18, the processor 5 causes the output device 6 to display a map picture including the roads, background and names, which are drawn in such a manner as to achieve the reduced scale of display instructed by the data stored in the operation control data section 10. In the drawing of the roads in accordance with the road network data, their drawing colors are decided by the road types of the link string attribute information of the link string header. According to the decided drawing color, the zigzag lines indicated by the link shape information of the link records are drawn.

Subsequently, the present position is displayed (step ST21). More specifically, on the map picture displayed at step ST20, the processor 5 causes a symbol representing the present position to be displayed at the location corresponding to the present position indicated by the position information stored in the present position data section 12. Subsequently, the route display is carried out (step ST22). More specifically, on the map picture displayed at step ST20, the processor 5 causes the route indicated by the route data obtained at step ST17 to be displayed in such a manner as to be distinguished clearly with placing emphasis on the route.

Subsequently, the route guidance is carried out (step ST23). More specifically, the processor 5 checks the presence or absence of the route guidance record about the nodes ahead of the link the vehicle travels, which is obtained at step ST19, and if the corresponding route guidance record is present, the processor delivers the route guidance record of the route guidance data to the output device 6 to display the guidance picture and to carry out the speech guidance about the nodes ahead. After that, the sequence returns to step ST11, to execute the processing of steps ST11-ST23 repeatedly thereafter.

As described above, using the map data updated by the map update information stored in the update DVD-ROM, the processor 5 carries out the map information processing such as the map display, map matching, route calculation, and route guidance.

Figure 21:
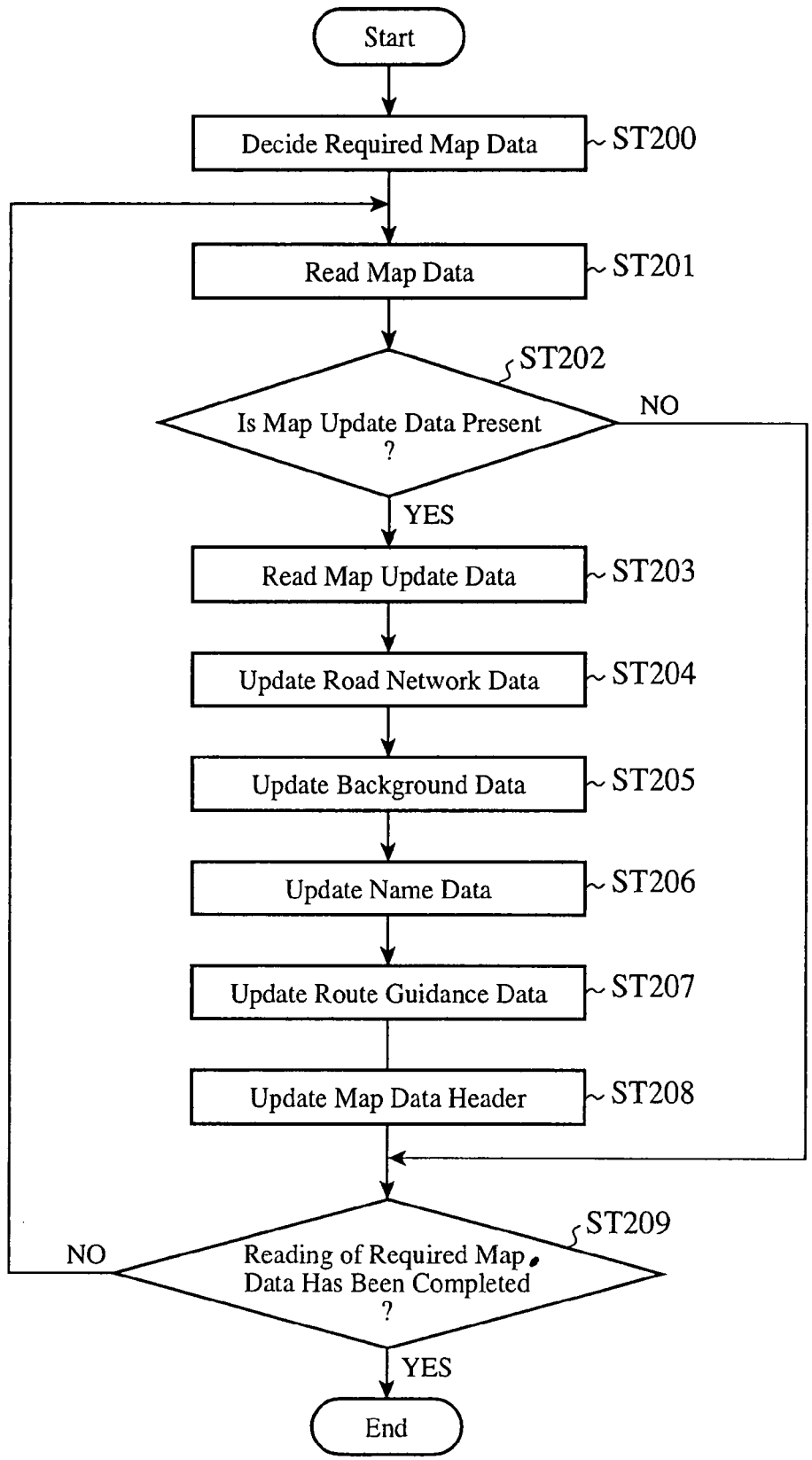
FIG. 21 is a flowchart illustrating details of the map data acquisition and update processing executed at step ST18 of FIG. 19.

Next, referring to the flowchart shown in FIG. 21, the details of the map data acquisition and update processing executed at the foregoing step ST18 will be described.

In the map data acquisition and update processing, the required map data is decided first (step ST200). More specifically, the processor 5 obtains the layer and area of each map data necessary for the map display around the present position, which is indicated by the position information stored in the present position data section 12, and for the map matching and route guidance, and stores them in the required map data management section 17 as the required map management data.

Subsequently, the map data is read (step ST201). More specifically, the processor 5 reads the map data indicated by the required map management data in the required map data management section 17 from the map information of the map information storage device 3, and stores it in the map data section 18. Subsequently, whether the map update data is present or not is checked (step ST202). More specifically, the processor 5 checks whether the map update information is stored in the map information storage device 3 or not. To be more specific, according to the map update management information of the map update information of the map information storage device 3, the processor 5 checks whether the map update data is present or not which has the same layer and the same area as the map data obtained at step ST201. Unless a decision is made that the map update data is present, the sequence proceeds to step ST209.

On the other hand, if a decision is made at step ST202 that the map update data is present, the map update data is read (step ST203). More specifically, the processor 5 reads from the map update information of the map information storage device 3 the map update data with the same layer and the same area as the map data obtained at step ST201, and stores it in the map update data section 19. Subsequently, the road network data is updated (step ST204). More specifically, according to the road network update data contained in the map update data obtained at step ST203 and stored in the map update data section 19, the processor 5 updates the road network data contained in the map data obtained at step ST201 and stored in the map data section 18. The update processing of the road network data will be described in more detail later.

Subsequently, the background data is updated (step ST205) More specifically, according to the background update data contained in the map update data which is obtained at step ST203 and stored in the map update data section 19, the processor 5 updates the background data contained in the map data which is obtained at step ST201 and stored in the map data section 18. Subsequently, the name data is updated (step ST206). More specifically, according to the name update data contained in the map update data which is obtained at step ST203 and stored in the map update data section 19, the processor 5 updates the name data contained in the map data which is obtained at step ST201 and stored in the map data section 18.

Subsequently, the route guidance data is updated (step ST207). More specifically, according to the route guidance update data contained in the map update data which is obtained at step ST203 and stored in the map update data section 19, the processor 5 updates the route guidance data contained in the map data which is obtained at step ST201 and stored in the map data section 18. Thus, according to the update record #g0 in the route guidance update data shown in FIG. 18, the route guidance record number #0 of the route guidance data as shown in FIG. 10 is deleted, and the route guidance data as shown in FIG. 10 is updated to the route guidance data as shown in FIG. 16. In the update processing of the route guidance data, the route guidance update data shown in FIG. 18 does not include any update record resulting from the update of the link string or link unrelated to the target route guidance data. Thus, the update of the route guidance data can be carried out quickly.

Subsequently, the map data header is updated (step ST208). More specifically, the processor 5 updates the contents of the map data header contained in the map data in conjunction with the update of the foregoing road network data, background data, name data and route guidance data. Subsequently, whether the reading of the required map data has been completed or not is checked (step ST209). More specifically, the processor 5 checks whether the reading of all the map data has been completed or not which are indicated by the map management data of the required map data management section 17. If a decision is made that the reading of the required map data has been completed, the map data acquisition and update processing is completed. On the other hand, unless a decision is made that the reading of the required map data has been completed, the sequence returns to step ST201 to repeat the processing of steps ST201-ST209 thereafter.

Figure 22:
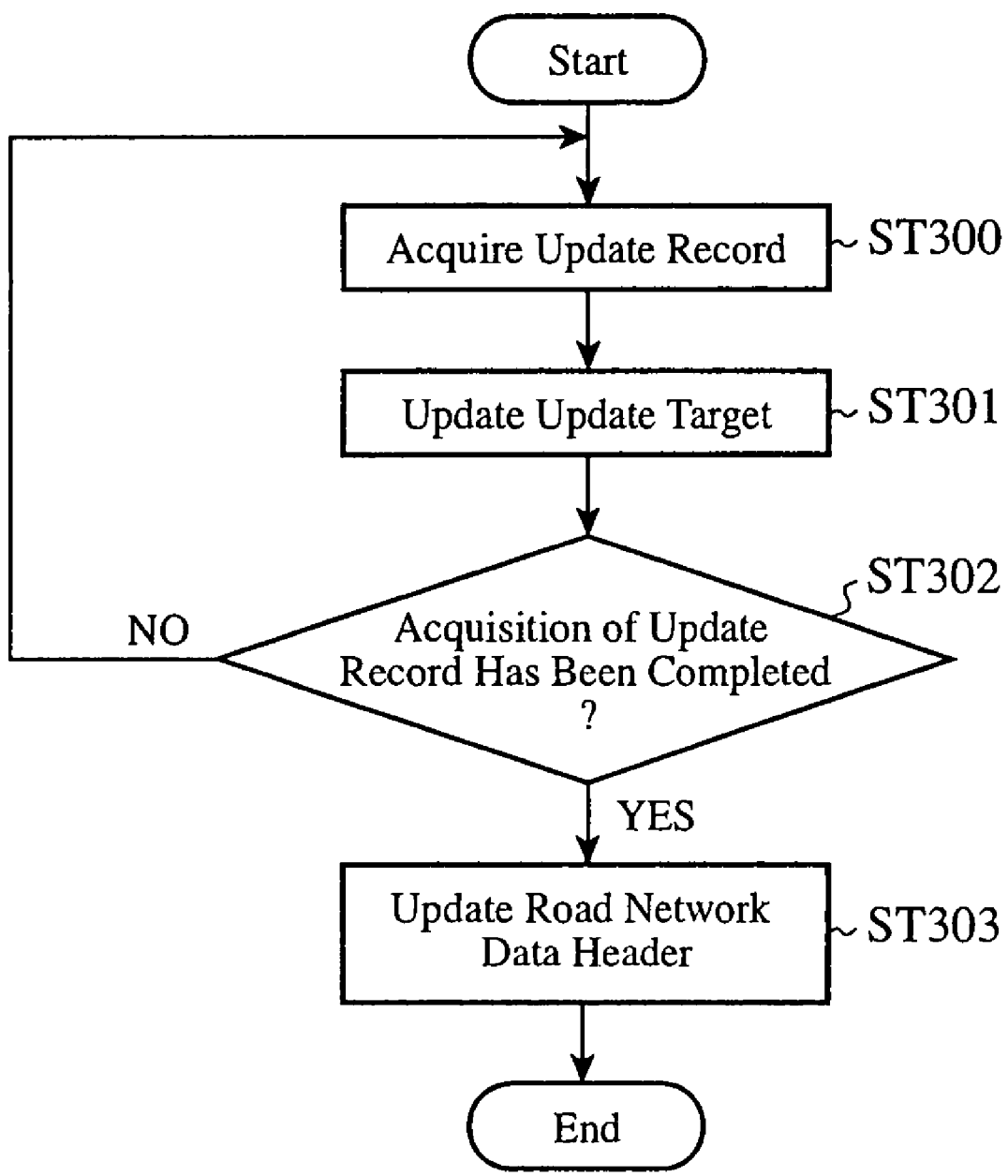
FIG. 22 is a flowchart illustrating details of the update processing of the road network data executed at step ST204 of FIG. 21.

Next, referring to the flowchart shown in FIG. 22, the details of the update processing of the road network data executed at step ST204 of FIG. 21 will be described.

In the update processing of the road network data, the update record acquisition is carried out first (step ST300). More specifically, the processor 5 obtains the update record from the road network update data contained in the map update data which is obtained at step ST203 and stored in the map update data section 18. Subsequently, the update target is updated (step ST301). More specifically, according to the update operation type and by using the update operand data, the processor 5 updates part of the road network data which is determined by the update target data type and update target designation of the update record obtained at step ST300.

More specifically, the following processing is carried out for each update record contained in the road network update data that is obtained at step ST300 and shown in FIG. 17.

(1) Concerning the update record #r1, the link string header of the link string record #0 shown in FIG. 8 is overwritten with the link string header 0'.
(2) Concerning the update record #r2, the link record #01 of the link list 0 shown in FIG. 8 is deleted.
(3) Concerning the update record #r3, the link record #01a and link record #01b are inserted before the link record #02 of the link list 0 shown in FIG. 8.
(4) Concerning the update record #r4, the link string record #6 is inserted before the link string record #1 shown in FIG. 8.
(5) Concerning the update record #r5, the matching node indication information of the link record #01 of the link list 1 shown in FIG. 8 is overwritten with the matching node indication information indicating the node N1 of the link string ML3.
(6) Concerning the update record #r6, the link string record #2 shown in FIG. 8 is deleted.
(7) Concerning the update record #r7, the link string header 4 of the link string record #4 shown in FIG. 8 is overwritten with the link string header 4'.
(8) Concerning the update record #r8, the link record #40 of the link list 4 shown in FIG. 8 is deleted.
(9) Concerning the update record #r9, the matching node indication information of the link record #03 of the link list 4 shown in FIG. 8 is overwritten with the matching node indication information indicating the node N9 of the link string ML6.

Subsequently, whether the update record acquisition has been completed or not is checked (step ST302). More specifically, processor 5 checks whether the acquisition of all the update records has been completed or not according to the road network update data. Unless a decision is made that the update record acquisition has been completed, the sequence returns to step ST300 to execute the foregoing processing repeatedly. In the course of the repeated execution, if a decision is made at step ST302 that the update record acquisition has been completed, the road network data header is updated (step ST303). More specifically, the road network data header contained in the road network data is updated in accordance with the updated result based on the update record. Thus, the update processing of the road network data is completed.

The foregoing processing at steps ST300-ST303 updates the road network data as shown in FIG. 8 and the route guidance data as shown in FIG. 10 to the road network data as shown in FIG. 15 and the route guidance data as shown in FIG. 16, respectively. Thus, the road network as shown in FIG. 4 is updated to the road network as shown in FIG. 14.

In the foregoing processing at steps ST300-ST303, the road network update data shown in FIG. 17 does not include any update records of the matching node indication information resulting from the elimination or addition of the unrelated link or link string. This enables the road network data to be updated more quickly. In addition, the road network update data shown in FIG. 17 does not include any update records of the matching node indication information resulting from the link division, which enables the road network data to be updated more quickly.

Furthermore, using the starting-ending point indication information as the matching node indication information enables the link indication information to indicate the terminal node of the link string as the identical node. This makes it possible to represent the node identity of all the nodes of the road network by using the link identifiers. As a result, the update of the road network data can be carried out quickly with preventing unnecessary update data from being produced.

Moreover, the road network update data shown in FIG. 17 does not include any update records of the traffic restriction information resulting from the update of the link strings unrelated to the traffic restriction information shown in FIG. 9. This enables the road network data to be updated more quickly. Besides, the road network update data shown in FIG. 17 does not include any update records for updating the storage position of the corresponding route guidance record, which enables the road network data to be updated more quickly.

As described above, the map information processing apparatus of the embodiment 1 in accordance with the present invention is configured in such a manner as to represent the node identity by the invariable link identifiers which are proper to the individual links and are independent of the order of the arrangement of the link string records or link records. Accordingly, the changes in the matching node indication information do not occur which result from the elimination or addition of the unrelated link string or link. This makes it possible to reduce the amount of the update data and to update the road network data more quickly. In addition, using the starting-ending point indication information enables the designation of the terminal node of the link string, which makes it possible to represent all the node identities using the invariable link identifiers proper to the links.

Furthermore, the present embodiment 1 is configured in such a manner as to employ the minimum value or maximum value of the range of the foregoing link identifier as the link indication information. Accordingly, even if the link is divided, it is not necessary to update the link indication information for designating both end nodes of the link before the division. This enables the reduction of the amount of update data and the higher speed update processing.

In addition, the present embodiment 1 is configured in such a manner as to store the corresponding node indication information not in the road network data but in the route guidance records. Thus, it need not update the road network data even if the route guidance record is updated. Accordingly, it can reduce the amount of update data of the road network data, and enables higher speed update processing. Besides, the present embodiment 1 employs the invariable link identifier proper to the link as the link indication information of the corresponding node indication information. Thus, it obviates the need for updating the corresponding node indication information resulting from the elimination or addition of the unrelated link string or link. As a result, it can reduce the amount of update data of the route guidance data, and enables higher speed update processing.

Moreover, the link string records are arranged in ascending order of the values of the link identifier range information. Accordingly, the present embodiment 1 can search for the link string record including the link with a desired link identifier quickly, and carry out the map information processing at high speed. Furthermore, to indicate the link for entering the node or the link for exiting from the node, the present embodiment 1 employs the invariable identical node identifier that is proper to the node and independent of the order of arrangement of the link string records. Thus, it need not carry out the update of the identical node identifier, which results from the deletion or addition of the unrelated link string. As a result, it can reduce the amount of update data, and carry out the update of the road network data more quickly.

Incidentally, the map information processing apparatus of the foregoing embodiment 1 can be modified as follows. More specifically, such a variation is possible which represents the matching node indication information and corresponding node indication information by using the link identifier of the link that has the node indicated by them as the ending node. In this case, the link identifier is used as the link indication information of the matching node indication information and the corresponding node indication information.

In addition, it is specified that when the node indicated is the starting node of the link string, the starting-ending point indication information of the matching node indication information and corresponding node indication information represents the starting point; and that when the node indicated is other than the starting node of the link string, the starting-ending point indication information represents the ending point. In addition, when the link identifier has a range, the maximum value of the range of the link identifier is employed as the link indication information of the matching node indication information and the corresponding node indication information.

The map information processing apparatus of the variation of the embodiment in accordance with the present invention offers advantages similar to those of the map information processing apparatus of the embodiment 1 for the same reason as the map information processing apparatus of the embodiment 1.

Embodiment 2

The embodiment 2 in accordance with the present invention differs from the embodiment 1 in that it provides a link identifier to a terminal virtual link, and represents the matching node indication information by using only the link indication information. When the link identifier has a range, the minimum value of the range of the link identifier is used as the link indication information. In addition, the present embodiment 2 represents the corresponding node indication information of the route guidance record by using the link identifier of the link having the corresponding node as the starting point. The matching node indication information and corresponding node indication information are the node indication information in the embodiment 2.

Figures 23, 24, 25:
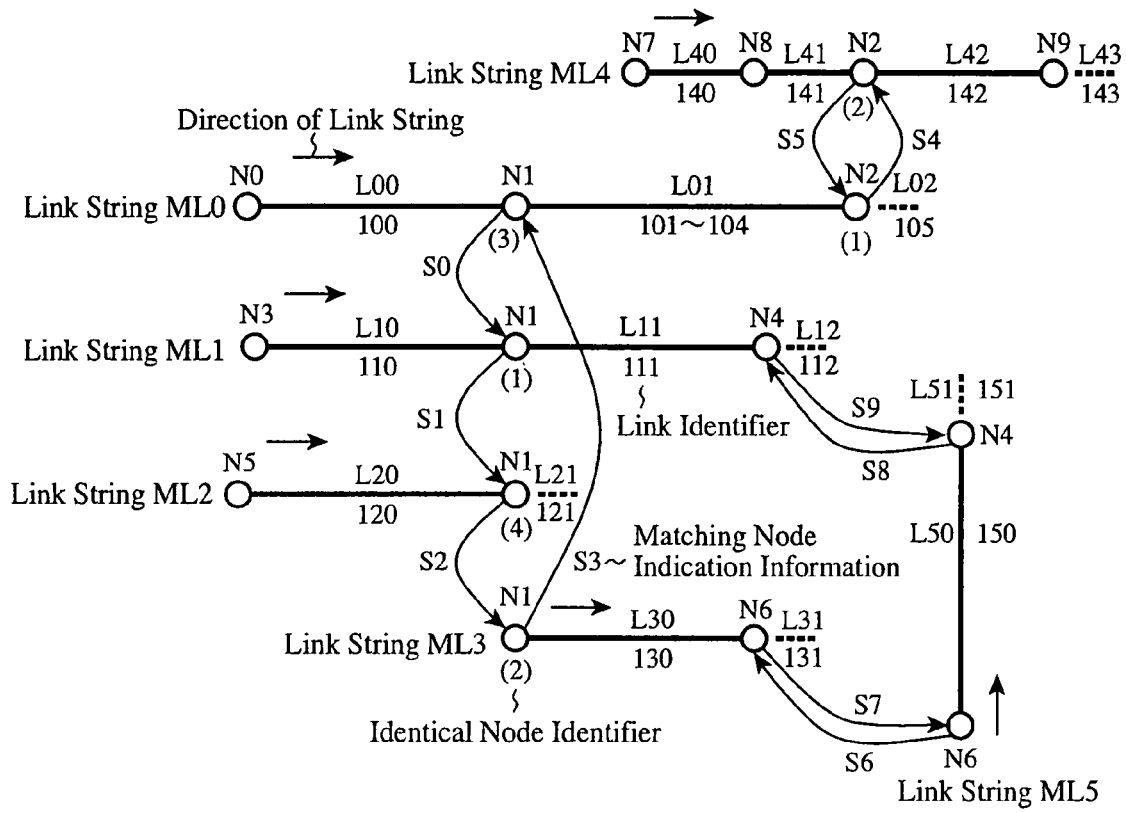
FIG. 23 is a diagram showing an example of a road network representing the road network as shown in FIG. 4 by using link strings in the map information processing apparatus of an embodiment 2 in accordance with the present invention.
FIG. 24 is a diagram showing an example of matching node indication information employed in the map information processing apparatus in the embodiment 2 in accordance with the present invention.
FIG. 25 is a diagram showing an example of corresponding node indication information employed in the map information processing apparatus in the embodiment 2 in accordance with the present invention.

FIG. 23 shows an example that provides a link identifier to each terminal virtual link of the road network as shown in FIG. 4. The terminal virtual links L02, L12, L21, L31, L43 and L51 are provided with link identifiers 105, 112, 121, 131, 143 and 151, respectively. Thus, the embodiment 2 provides the link identifiers to all the links and terminal virtual links. This means that for all the nodes constituting each link string, the links having these nodes as a starting point are provided with the link identifiers. Accordingly, all the nodes can be indicated using the link identifiers having the nodes as a starting point. Thus, the matching node indication information can indicate the identical nodes by the link indication information only.

The road network data the present embodiment 2 employs differs from the road network data in the embodiment 1 in that the matching node indication information consists of only the link indication information. FIG. 24 shows an example of the matching node indication information used in the embodiment 2. For example, in the matching node indication information provided to the link record of the link L01 of the link string ML0 of FIG. 23, the link identifier "111" of the link L11 is stored as the link indication information indicating the node N1 of the link string ML1, thereby representing the matching node indication information S0. In addition, in the matching node indication information provided to the link record of the link L42 of the link string ML4, the link identifier "105" of the link L02 is stored as the link indication information indicating the node N2 of the link string ML0, thereby representing the matching node indication information S5.

The route guidance data the present embodiment 2 employs differs from the route guidance data in the embodiment 1 in that the corresponding node indication information consists of only the corresponding link indication information. FIG. 25 shows an example of the corresponding node indication information used in the embodiment 2. For example, the route guidance record #0 and route guidance record #1 of FIG. 10 are node related information about the node N1 of the link string ML2 and the node N2 of the link string ML4 in the road network of FIG. 23 as in the embodiment 1.

In the present embodiment 2, as the link indication information of the corresponding node indication information of the route guidance record #0, is stored the link identifier "121" of the terminal virtual link L21 having the node N1 as the starting point. Likewise, as the link indication information of the corresponding node indication information of the route guidance record #1, is stored the link identifier "142" of the link L42 having the node N2 as the starting point. In addition, the route guidance record #0 and route guidance record #1 are stored in this order so that they are arranged in ascending order of the values of the link identifiers the corresponding link indication information represents.

The operation of the map information processing apparatus of the present embodiment 2 differs from that of the embodiment 1 in that it leaves out the processing of the starting-ending point indication information of the matching node indication information and the processing of the starting-ending point indication information of the corresponding node indication information.

As described above, the map information processing apparatus of the embodiment 2 in accordance with the present invention is configured in such a manner as to provide all the links and terminal virtual links with invariable link identifiers and to represent the node identity by the link identifiers independent of the order of the arrangement of the link string records or link records. Accordingly, the node identity can be represented using the link identifiers for all the nodes of the road network, and the changes in the matching node indication information do not occur which result from the elimination or addition of the unrelated link string or link. This makes it possible to reduce the amount of the update data and to update the road network data quickly.

In addition, the present embodiment 2 is configured in such a manner as to employ the minimum value of the range of the link identifier as the link indication information. Accordingly, even if the link is divided, it is not necessary to update the link indication information of the matching node indication information for designating the starting node of the link before the division. This enables the reduction of the amount of update data and the higher speed update processing.

In addition, the present embodiment 2 is configured in such a manner as to store the corresponding node indication information not in the road network data but in the route guidance records. Thus, it need not update the road network data even if the route guidance record is updated. Accordingly, it can reduce the amount of update data of the road network data, and enables higher speed update processing. Besides, the present embodiment 2 employs the invariable link identifier as the link indication information of the corresponding node indication information. Thus, it obviates the need for updating the corresponding node indication information resulting from the elimination or addition of the unrelated link string or link. As a result, it can reduce the amount of update data of the route guidance data, and enables higher speed update processing.

Furthermore, the link string records are arranged in ascending order of the values of the link identifier range information. Accordingly, the present embodiment 2 can search for the link string record including the link with a desired link identifier quickly, and carry out the map information processing at high speed. Moreover, to indicate the link for entering the node or the link for exiting from the node, the present embodiment 2 employs the invariable identical node identifier that is proper to the node and independent of the order of arrangement of the link string records. Thus, it need not carry out the update of the identical node identifier, which results from the deletion or addition of the unrelated link string. As a result, it can reduce the amount of update data, and carry out the update of the road network data more quickly.

Incidentally, the map information processing apparatus of the embodiment 2 can be modified as follows. More specifically, such a variation is possible which represents the matching node indication information and corresponding node indication information by using the link identifier of the link having the node indicated by them as the ending node. In this case, the link identifier is used as the link indication information of the matching node indication information and the corresponding node indication information.

In addition, when the link identifier has a range, the maximum value of the range of the link identifier is employed as the link indication information. Furthermore, instead of the virtual terminal link, a virtual starting-point link is supposed which is a virtual link having the starting node of the link string as an ending node. The virtual starting-point link is also provided with a proper and invariable link identifier.

The map information processing apparatus of the variation of the embodiment 2 in accordance with the present invention offers advantages similar to those of the map information processing apparatus of the embodiment 2 for the same reason as the map information processing apparatus of the embodiment 2.

Although the map information processing apparatus of the foregoing embodiments 1-2 employs the hard disk as the storage medium of the map information storage device 3, this is not essential. For example, instead of the hard disk, a readable/writable storage medium such as a memory card and magneto-optical disk can be used. In addition, although the map information processing apparatus is configured in such a manner as to store the map information in the hard disk of the map information storage device 3, this is not essential. For example, it can be configured in such a manner as to store the map information in a read-only storage medium such as a CD-ROM (Compact Disc Read Only Memory) or DVD-ROM, and to read the map information stored in the storage medium with the reading unit of the storage medium. In addition, although the map information processing apparatus is configured in such a manner as to retrieve the map data from the map information storage device 3, such a configuration is also possible which retrieves the map data from another apparatus using a communication means.

Furthermore, although the map information processing apparatus employs the DVD-ROM as the storage medium of the map update information, this is not essential. For example, a readable storage medium such as a CD-ROM and memory card can be used. Besides, although the map information processing apparatus employs the DVD drive as the update information acquisition device 4, it can employ various devices as long as they are appropriate as the storage medium of the map update information. In addition, although the update information acquisition device 4 is configured in such a manner as to retrieve the map update information from the storage medium of the map update information, this is not essential. For example, a configuration is also possible which retrieves the map update information from another apparatus using a communication means. Furthermore, although the map information processing apparatus is configured in such a manner as to store the map update information retrieved by the update information acquisition device 4 in the map information storage device 3, and to read the map update data from the map information storage device 3, this is not essential. For example, such a configuration is also possible which retrieves the map update data from another apparatus using a communication means. Moreover, although the map information processing apparatus is configured in such a manner as to store the map update information retrieved by the update information acquisition device 4 in the map information storage device 3, and to read the map update data from the map information storage device 3, this is not essential. For example, such a configuration is also possible which retrieves the map update data directly from the storage medium of the map update information by the update information acquisition device 4.

As for the processing of storing the updated map data into the map information storage device 3, although its description is omitted, such a configuration is possible which stores the updated map data in the map information storage device 3. In addition, although the map information processing apparatus is configured in such a manner as to carry out the route calculation using the route calculation data, it can be configured in such a manner as to carry out the route calculation using the road network data of the map data. Furthermore, although the map information processing apparatus is configured in such a manner as to use the link string record number and link number to designate the update target, it can be configured in such a manner as to use the link identifier.

INDUSTRIAL APPLICABILITY

As described above, the map information processing apparatus and the storage medium of the map information in accordance with the present invention can reduce the amount of data for instructing the update and carry out the update processing simply and quickly when a road or intersection is added or eliminated. Thus, it is suitably applied to the car navigation system, mobile phone, mobile information terminal and the like.

What is claimed is:

1. A map information processing apparatus comprising:
   a map information storage device for storing map information containing map data; and
   a processor for updating the map information stored in said map information storage device,
   wherein road network data contained in the map data stored in said map information storage device has a data structure in which:
   said road network data is composed of link strings each of which represents a series of roads in a road network as a series of links connecting nodes, said road network being represented by the nodes indicating points on the roads and by the links indicating the roads between the points;
   each of said link strings is represented by a link string record in which link records defining the links are arranged in order of the series of the links;
   each link constituting said link strings is provided with an invariable link identifier proper to each link; and
   node indication information for designating each node included in said link strings is represented by the link identifier of the link having the node as its one end.

2. The map information processing apparatus according to claim 1, wherein the node indication information for designating each node included in the link string comprises: link indication information equivalent to the link identifier of each link having the node as its one end; and starting-ending point indication information representing whether the node is a starting point or ending point of the link designated by said link indication information.

3. The map information processing apparatus according to claim 2, wherein the link identifier of the link having the node designated by the node indication information as one end of that link has a plurality of values within a prescribed range, and wherein one of a minimum value and a maximum value of the plurality of values within the prescribed range said link identifier possesses is used as the link indication information of the node indication information.

4. The map information processing apparatus according to claim 2, wherein as matching node indication information for designating an identical node included in a link string and in another link string, the link indication information designating the identical node and the starting-ending point indication information are used.

5. The map information processing apparatus according to claim 2, further comprising node related information about a node provided in isolation from the road network data, wherein as corresponding node indication information for designating the node corresponding to the node related information, the link indication information for designating the node and the starting-ending point indication information are used.

6. The map information processing apparatus according to claim 1, wherein the node indication information for designating each node included in the link string represents the node by using link indication information equivalent to the link identifier of the link having one of the starting node and ending node, which are determined in accordance with a direction of the link string, as one end of the link.

7. The map information processing apparatus according to claim 6, wherein the link identifier of the link having the node designated by the node indication information as one end of that link has a plurality of values within a prescribed range, and wherein one of a minimum value and a maximum value of the plurality of values with in the prescribed range is used as the link indication information of the node indication information.

8. The map information processing apparatus according to claim 6, further comprising a virtual link that is virtually connected to only one end node of the link string defined in accordance with the direction of the link string, wherein
   all the links including the virtual link are each provided with invariable link identifier proper to each link; and
   the link identifiers of all the links including the virtual link are used as the link indication information.

9. The map information processing apparatus according to claim 6, wherein as matching node indication information for designating an identical node included in a link string and in another link string, the link indication information designating the identical node is used.

10. The map information processing apparatus according to claim 6, further comprising node related information about a node provided in isolation from the road network data, wherein as corresponding node indication information for designating the node corresponding to the node related information, the link indication information for designating the node is used.

11. The map information processing apparatus according to claim 1, wherein the link string records include link identifier range information representing a range of values of the link identifier provided to a link constituting the link string, and are arranged in one of ascending and descending order of the values represented by the link identifier range information.

12. The map information processing apparatus according to claim 1, further comprising an update information acquisition device for obtaining map update data for updating the map data stored in said map information storage device,
   wherein said processor comprises:
   a map data acquisition section for obtaining the map data from said map information storage device;
   map update data acquisition section for obtaining the map update data from said update information acquisition device; and
   a map data update section for updating the map data obtained by said map data acquisition section with the map update data obtained by said map update data acquisition section.

13. A map information processing apparatus comprising:
   a map information storage device for storing map information containing map data; and
   a processor for updating the map information stored in said map information storage device,
   wherein road network data contained in the map data stored in said map information storage device has a data structure in which:
   said road network data is composed of link strings each of which represents a series of roads in a road network as a series of links connecting nodes, said road network being represented by the nodes indicating points on the roads and by the links indicating the roads between the points;

each of said link strings is represented by a link string record in which link records defining the links are arranged in order of the series of the links;

each of identical nodes contained in said link strings is provided with an invariable identical node identifier that is proper to the identical nodes; and said identical node identifier is used to indicate a link for entering the node or a link for exiting from the node.

14. The map information processing apparatus according to claim 13, further comprising:

an update information acquisition device for obtaining map update data for updating the map data stored in said map information storage device, wherein said processor comprises:

a map data acquisition section for obtaining the map data from said map information storage device;

map update data acquisition section for obtaining the map update data from said update information acquisition device; and a map data update section for updating the map data obtained by said map data acquisition section with the map update data obtained by said map update data acquisition section.

15. A computer readable storage medium for storing map data containing road network data having a data structure in which:

said road network data is composed of link strings each of which represents a series of roads in a road network as a series of links connecting nodes, said road network being represented by the nodes indicating points on the roads and by the links indicating the roads between the points;

each of said link strings is represented by a link string record in which link records defining the links are arranged in order of the series of the links;

each link constituting said link strings is provided with an invariable link identifier proper to each link; and node indication information for designating each node included in said link strings is represented by the link identifier of the link having the node as its one end.

* * * * *